United States Patent [19]

Maskovyak et al.

[11] Patent Number: 4,771,403
[45] Date of Patent: Sep. 13, 1988

[54] I/O MODULE WITH MULTI-FUNCTION INTEGRATED CIRCUITS AND AN ISOLATION INTERFACE FOR MULTIPLEXING DATA BETWEEN A MAIN PROCESSOR AND I/O DEVICES

[75] Inventors: George D. Maskovyak, Parma; Robert Lantzy, Jr., Wickliffe, both of Ohio

[73] Assignee: Allen-Bradley Company, Inc., Milwaukee, Wis.

[21] Appl. No.: 672,455

[22] Filed: Nov. 16, 1984

[51] Int. Cl.[4] .................................................. G06F 9/06
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 3,959,776 | 5/1976 | Morley | 364/900 |
| 4,152,762 | 5/1979 | Bird et al. | 364/200 |
| 4,196,476 | 4/1980 | Steiner | 364/900 |
| 4,275,455 | 6/1981 | Barlett | 364/900 |
| 4,328,586 | 5/1982 | Hansen | 375/36 |
| 4,493,028 | 1/1985 | Heath | 364/200 |
| 4,500,933 | 2/1985 | Chan | 360/69 |
| 4,501,021 | 2/1985 | Weiss | 455/601 |
| 4,519,027 | 5/1985 | Vogelsberg | 364/185 |
| 4,528,675 | 7/1985 | Esterling et al. | 375/9 |
| 4,541,055 | 9/1985 | Wolfe et al. | 364/474 |
| 4,548,018 | 10/1985 | Clements et al. | 364/474 |
| 4,593,352 | 6/1986 | Castel et al. | 364/200 |
| 4,593,369 | 6/1986 | Thompson | 364/552 |
| 4,593,380 | 6/1986 | Kocher et al. | 364/900 |
| 4,610,206 | 9/1986 | Kubala et al. | 104/26 B |
| 4,627,054 | 12/1986 | Cooper et al. | 371/11 |
| 4,648,029 | 3/1987 | Cooper et al. | 364/200 |
| 4,691,296 | 9/1987 | Struger | 364/900 |

Primary Examiner—Raulfe B. Zache
Assistant Examiner—Eric Coleman
Attorney, Agent, or Firm—Quarles & Brady

[57] ABSTRACT

The density of I/O circuits on input and output modules in a programmable controller is doubled, while the number of optically coupled circuits is reduced, by transmitting data serially through one of the optically coupled circuits. Optically coupled circuits are also used for address and test signals and error-checking circuitry is provided to sense failures of the optically coupled circuits. The optically coupled circuits on each module are connected between two universal large scale integrated (LSI) circuits. The universal circuit can be operated on either the processor side or the machine side of either an input module or an output module by selecting a corresponding one of its four modes of operation. The multiplexing electronics on the input and output modules, aside from the optically coupled circuits, is integrated into just two components, and only one universal component is required for replacement of either of these two.

19 Claims, 15 Drawing Sheets

ERROR BIT GENERATOR

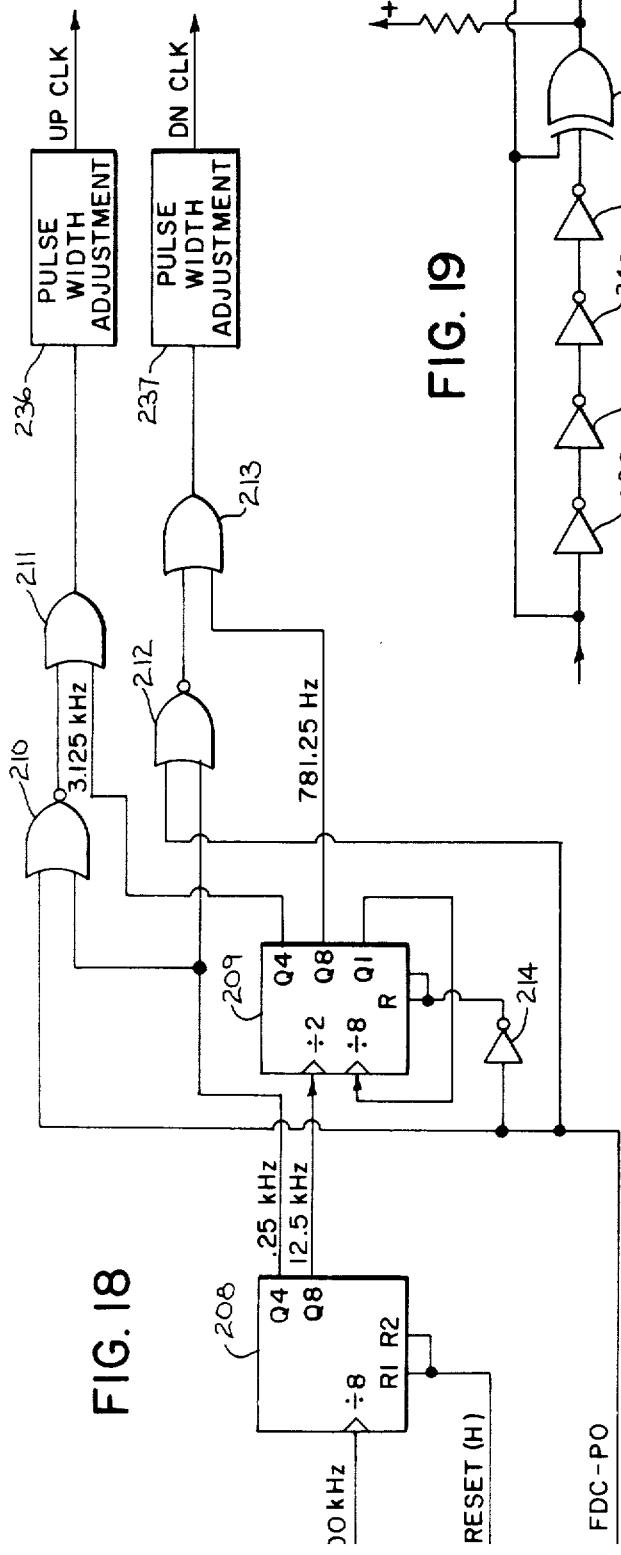
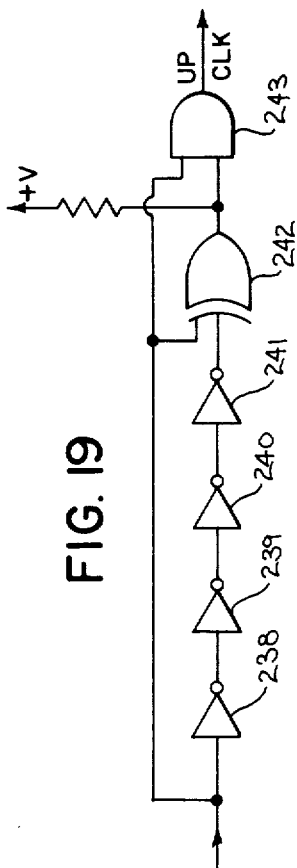
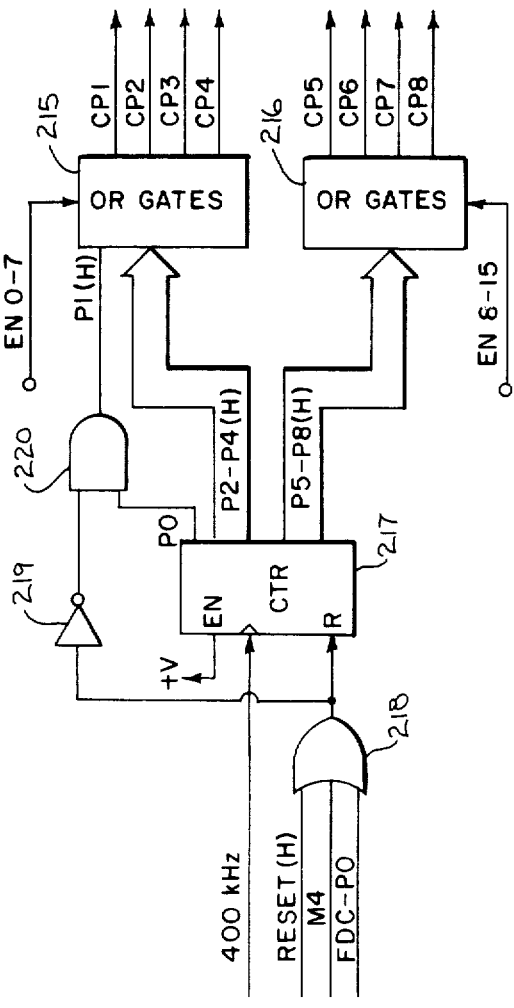
FIG. 18
FIG. 19
FIG. 20

I/O MODULE WITH MULTI-FUNCTION INTEGRATED CIRCUITS AND AN ISOLATION INTERFACE FOR MULTIPLEXING DATA BETWEEN A MAIN PROCESSOR AND I/O DEVICES

BACKGROUND OF THE INVENTION

1. Field of the Invention

The invention relates to digital controllers that are used to control industrial machines and processes.

2. Description of the Prior Art

A programmable controller for controlling industrial machines and processes typically has a main processor and a group of input and output (I/O) interface modules. The I/O modules are mounted in the slots of an equipment rack. A slot at the left end can accommodate a small processor module. This slot can also accommodate an adapter module when the main processor is located apart from the equipment racks. These two alternative processor arrangements are shown and described in Struger, U.S. Pat. No. 4,250,563, issued Feb. 10, 1981. There, the separate main processor is located relatively close to the equipment rack, but with the use of a serial data link, the main processor can be located a great distance away as described in Schultz et al, U.S. Pat. No. 4,413,319, issued Nov. 1, 1983.

An I/O module contains either a plurality of output circuits or a plurality of input circuits. The circuits are connected through edge connectors on the front of the rack and through bundles of external wires to input and output devices on a machine or process. Typical output devices are solenoids, relays and motor starters. Typical input devices are limit switches, photoelectric sensors and proximity sensors. Each single-bit output circuit generates the proper AC or DC signal to operate an output device in response to a single digital data signal. Each single-bit input circuit responds to an AC or DC signal from an input device to generate an individual digital data signal. By including eight discrete input circuits and some multiplexing circuitry in a single input module, data is collected from individual I/O devices and assembled into an eight-bit word of data or "byte". The byte can then be transmitted over a single data channel. Similarly, by including eight discrete output circuits and some demultiplexing circuitry in a single output module, signals can be distributed from bytes of data to individual output devices.

A controller of an earlier generation, shown in Dummermuth, U.S. Pat. No. 3,942,158, issued Mar. 2, 1976, includes sixteen input circuits or sixteen output circuits per I/O module, as well as a sixteen-bit I/O data bus. In following generations of controllers, the size and amount of hardware in the I/O modules and the equipment rack supporting them was reduced by a factor of about one half, by reducing the number of circuits per module to eight and by using an eight-bit data bus. It is now desirable to increase the number of I/O circuits per module to sixteen while maintaining the package size now being used for modules with eight I/O circuits. This increase in the density of I/O circuits is to be accompanied at a reduced cost per I/O bit of capacity.

From a system viewpoint, the I/O modules are connected on one side (the back) to the main processor and on another side (the front) to machine or process control devices. From an electrical viewpoint, the I/O modules isolate 120-volt AC signals or 24-volt DC signals, for example, on the machine side of the controller, from the 5-volt logic level signals used by the main processor. This electrical isolation is typically accomplished with optically coupled circuits in which current on an input side causes an emitter to emit light. The light is received by a light detector that generates an output current. With optical coupling, an overcurrent or fault on the machine side of the I/O module will not cause a corresponding overcurrent or fault on the processor side.

The conventional practice is to allocate one optically coupled circuit for each single-bit I/O device, so that all of the I/O devices are isolated from the main processor. An increase in I/O circuits per module would normally result in an increase in such optically coupled circuits. In the present state of the art, these optically coupled circuits are more expensive and are more sensitive to heat than the other types of integrated circuits used in I/O modules. Therefore, the increase in density of I/O circuits is not easily achieved.

Another technical problem is maintaining the compatability of new I/O modules with presently available processors and equipment racks that are the other parts of the modular system. These processors use a scanning technique based on a single-byte transfer to or from each eight-bit I/O module, so the equipment rack has a backplane circuit board that uses a byte-wide data bus. If each I/O module is to handle two bytes, there must be an improvement in the enabling circuitry to allow the two bytes to be transferred over the single-byte data bus.

SUMMARY OF THE INVENTION

The invention is embodied in a double density or sixteen-bit I/O module that occupies the same sized slot as its eight-bit predecessor.

This double density module uses relatively fewer isolation circuits by multiplexing data across the isolation interface. Whereas, the prior art used one isolation circuit for each I/O circuit, the module of the invention transmits data serially through a single isolation circuit. This requires several additional isolation circuits for handling multiplexing addresses, but the result is a substantial reduction from the sixteen isolation circuits used for coupling the same amount of data with prior I/O modules.

The isolation circuits on each I/O module are connected between two universal integrated circuits. Each integrated circuit (IC) includes the same circuitry, but a different mode of operation is selected for each IC, depending upon its position on the machine side or the processor side of the isolation interface. The universal IC therefore has two modes of operation when used on an output module, and two more modes of operation when used on an input module. This has been accomplished by designing a single circuit with subcircuits for operating in all four modes of operation. This circuit is then reduced in size to a single integrated circuit, in which the non-utilization of some of the subcircuits in particular modes of operation becomes insignificant.

Included in the universal IC is a backplane logic circuit of a type disclosed in a copending application of Struger entitled "Method and Apparatus for Scanning a Higher Density of I/O Circuits." There, the signals to the I/O modules are modified so that each module is enabled twice during the input sequence and twice during the output sequence using the same signals which were used previously to enable each I/O module only once in each sequence. The scanning of I/O modules is also modified by introducing byte address signals in a second form of scanning that allows transfer of multiple bytes to each I/O module.

The first method of scanning doubled the amount of data that could be transferred during the I/O scanning sequence. Further circuitry is needed, however, to assure that the bytes are coupled to and from the system processor in the correct order for the right-hand module in each pair. Thus, the backplane logic circuit has been improved for sensing the position of the I/O module, and reversing the order of the bytes coupled to the I/O data bus, if the I/O module senses its position as being in a right-hand slot.

It is one object of the invention to increase the density of I/O circuits for a given space allocated to each I/O module.

It is another object of the invention to reduce the cost of I/O modules per bit of I/O capacity.

It is another object of the invention to reduce the ratio of isolation circuits to bits of I/O capacity per I/O module.

It is another object of the invention to reduce the number of circuit packages mounted on each I/O module circuit board.

It is another object of the invention to provide a single integrated circuit (IC) for performing four different I/O functions.

These and other objects and advantages of the invention will become apparent from the following description and from the drawings, which form a part hereof, and which are referred to in the description. The drawings and description disclose a preferred embodiment—by way of an example of the invention. Such embodiment does not, however, represent the full scope of the invention, because this has been reserved for definition by the claims that follow the description.

BRIEF DESCRIPTION OF THE DRAWINGS

FIG. 18 is an electrical schematic diagram of a portion of the timing circuitry in FIGS. 9 and 10 for generating timing signals to the circuit in FIG. 16;

FIG. 19 is a detail schematic of a pulse width adjustment circuit seen in FIG. 18;

FIG. 20 is an electrical schematic diagram of a portion of the timing circuitry in FIGS. 9 and 10 for sequencing output signals;

DETAILED DESCRIPTION OF THE PREFERRED EMBODIMENTS

Figure 1:
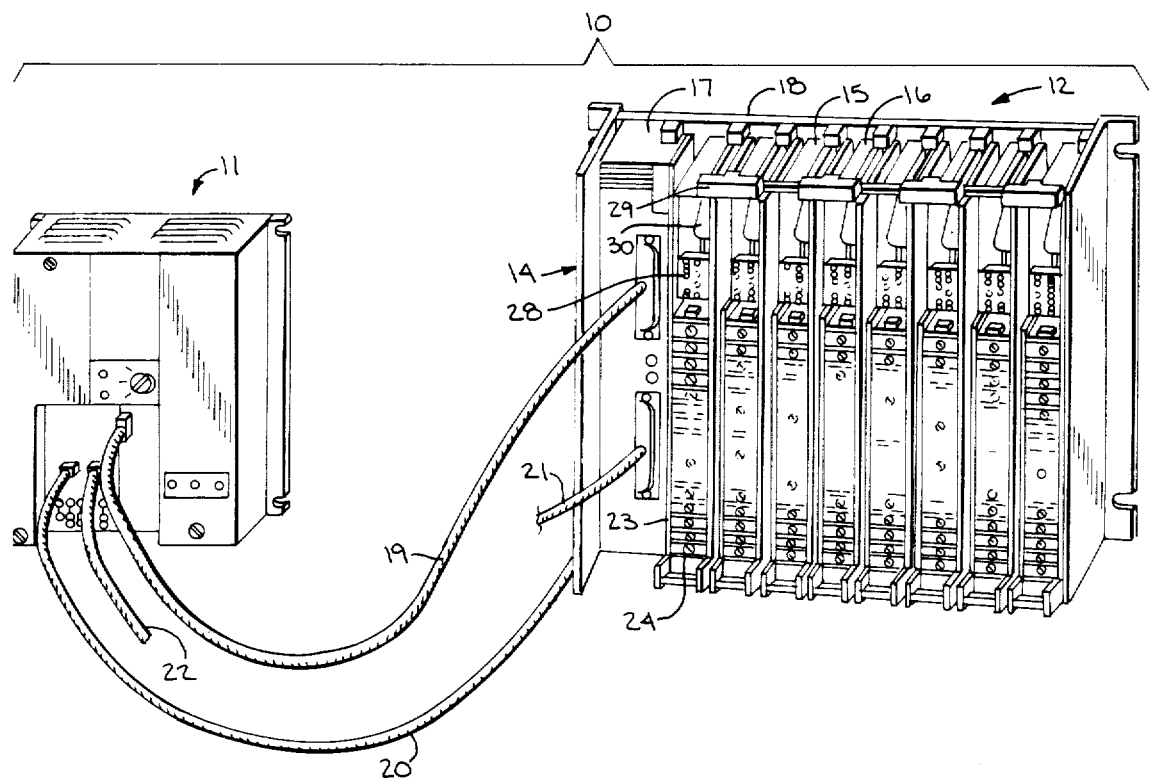
FIG. 1 is a perspective view of a programmable controller using the I/O modules of the present invention.
Figure 2:
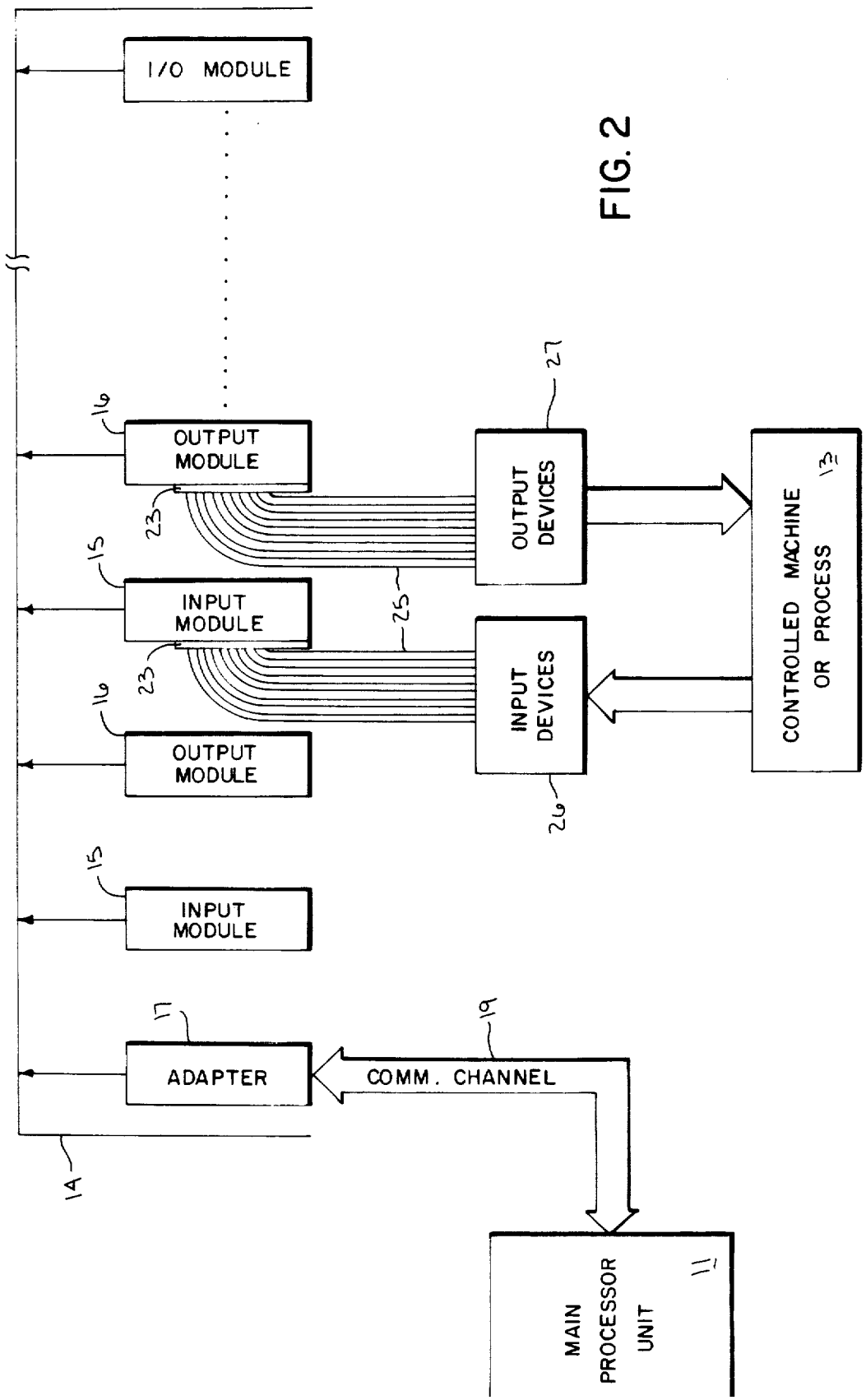
FIG. 2 is a block diagram of the programmable controller of FIG. 1 illustrating its connection to control a machine or process.

FIGS. 1 and 2 show a programmable controller 10 which includes a main processor unit 11 and an I/O interface assembly 12 for controlling the operation of a machine, an assembly line, an industrial process or other controlled system 13. The I/O interface assembly 12 includes an equipment rack 14 which holds a mix of input and output modules 15, 16, known generically as I/O modules. Among the I/O modules 15, 16 are a DC input module 15 and an AC output module 16 which incorporate the present invention.

The main processor unit 11 communicates with the I/O modules 15, 16 through an adapter module 17 in a slot at the left end of the rack 13. The adapter module 17 is electrically connected to the I/O modules 15, 16 through a backplane circuit board 18 running across the back of the rack 13. The main processor unit 12 communicates address, data and control signals to the adapter module 17 through a communication channel 19 (FIG. 2) which takes the form of a cable in FIG. 1. Also seen in FIG. 1 is a power cable 20 which connects a power supply in the main processor unit 11 to the I/O interface assembly 12, and cables 21, 22 for connecting other I/O interface assemblies to the main processor unit 11.

Attached to a lower transverse support rod (not shown) on the equipment rack 14 are swing arm connectors 23 which pivot upwardly to engage the front edges of circuit boards (not shown) on which the I/O modules 15, 16 are built. Each connector 23 has twenty-one screw-type wiring terminals 24, the faded out portion of the terminals 24 in FIG. 1 indicating their repeating pattern. Individual wires 25 seen in FIG. 2 connect the lower sixteen terminals on each swing arm 23 to I/O devices 26, 27 on the controlled system 13.

Also seen in FIG. 1, just above the swing arm connectors 23, are groups of LED status indicators 28, which are part of the I/O modules 15, 16 and which are helpful in observing the status of individual I/O devices 26, 27, assuming that no faults are present. Above these indicators 28 are a group of downward pivoting latches 29, which are mounted on an upper support rod of the rack 14 to engage lugs 30 on the I/O modules 15, 16 to hold them in place when the swing arm connectors 23 are pulled forward for disconnection.

The I/O devices may be input devices 26 such as photocells, limit switches, proximity sensors, pushbutton and selector switches. The I/O devices may also be output devices 27 such as solenoids, relays and various types of electrically actuated motor drives. The input devices 26 are typically connected to an input module and the output devices 27 are typically connected to an output module, as shown in FIG. 2, although bi-directional I/O modules are also known.

The DC input module 15 of the invention is rated to sense signals in a first range from 10 DC volts to 24 DC volts or in a second range from 20 DC volts to 60 DC volts. The AC output module 16 of the invention is rated for controlling output devices that operate on 12-120 AC volts. In addition to these examples, the invention can also be applied to a DC output module and an AC input module. Power for the I/O devices is supplied through four power terminals at the top of each connector 23 in FIG. 1.

Referring to FIG. 2, the I/O modules 15, 16 store data signals representing the status of the input and output devices 26, 27, and the main processor unit 11 uses this data during execution of a control program. The I/O status data is transferred from the I/O modules 15, 16 to a memory in the main processor unit 11 during an operation known as an I/O scan. The data is transferred via the backplane circuit board 18, the adapter module 17 and the communication channel 19 mentioned earlier.

In the prior art discussed earlier herein, the I/O modules 15, 16 each held a byte, or eight bits of I/O status data, which was transmitted to or received from the main processor unit 11 over a byte-wide I/O data bus in the backplane circuit board 18. During the I/O scan, each I/O module 15, 16 had to be enabled, in turn, so that it could have exclusive access to the data bus for a period of time sufficient for its byte of data to be transferred. The amount of data transferred relative to the prior sixteen-module or "full-rack" I/O interface assembly was typically one hundred twenty-eight "bits" or sixteen "bytes".

The I/O modules of the present invention have twice the capacity of their predecessors as evidenced by the additional data terminals 24 provided on each swing arm connector 23 in FIG. 1. The I/O modules of the prior art used only eight data terminals. With the present invention, the capacity of a full-rack I/O interface assembly has been expanded from one hundred twenty-eight bits to two hundred fifty-six bits of I/O status data. For convenience of the illustration in FIG. 1, only a "half-rack" assembly 12 with eight I/O modules 15, 16 has been shown.

The I/O modules 15, 16 couple the operating signals of the I/O devices to logic-level data signals in the range of 0-5 DC volts. The status of sixteen DC input devices 26 is represented by sixteen logic-level signals, which are the status data signals, or more simply "status data". The DC input module 15 provides the circuitry for this coupling of input signals. Conversely, logic level signals of 0-5 DC volts can also be coupled to output operating signals to operate the AC output devices 27, and this is the function of the AC output module 16.

In industrial control equipment, as in other types of electrical equipment, an important consideration is the isolation of a low-power electronic section of the equipment, including the main processor unit 11, from the influences of the higher power equipment of the controlled system 13. In programmable controllers, this isolation has been provided by the I/O modules. Optically coupled circuits are solid state circuits that have been used in I/O modules for this purpose. The invention represents an appreciation that these circuits are relatively more expensive and are more sensitive to heat than the other types of circuitry used in I/O modules.

Previously, it had been considered that one optically coupled circuit was required for each I/O device, so that if such a circuit failed, only a single I/O device would be affected. The present invention is a departure from that approach in transmitting sixteen bits of data serially, through a single optical coupling circuit. This requires error-checking circuitry that would generally offset the economics of reducing the number of optically coupled circuits. The invention solves this problem by integrating the error-checking circuitry into a single integrated circuit. This has led to yet another discovery that a single integrated circuit can provide the principal functions of the I/O modules, aside from optical coupling, if it is operable in four different modes, two modes for input modules--one for each side of the isolation interface--and two corresponding modes for output modules.

Figure 3:
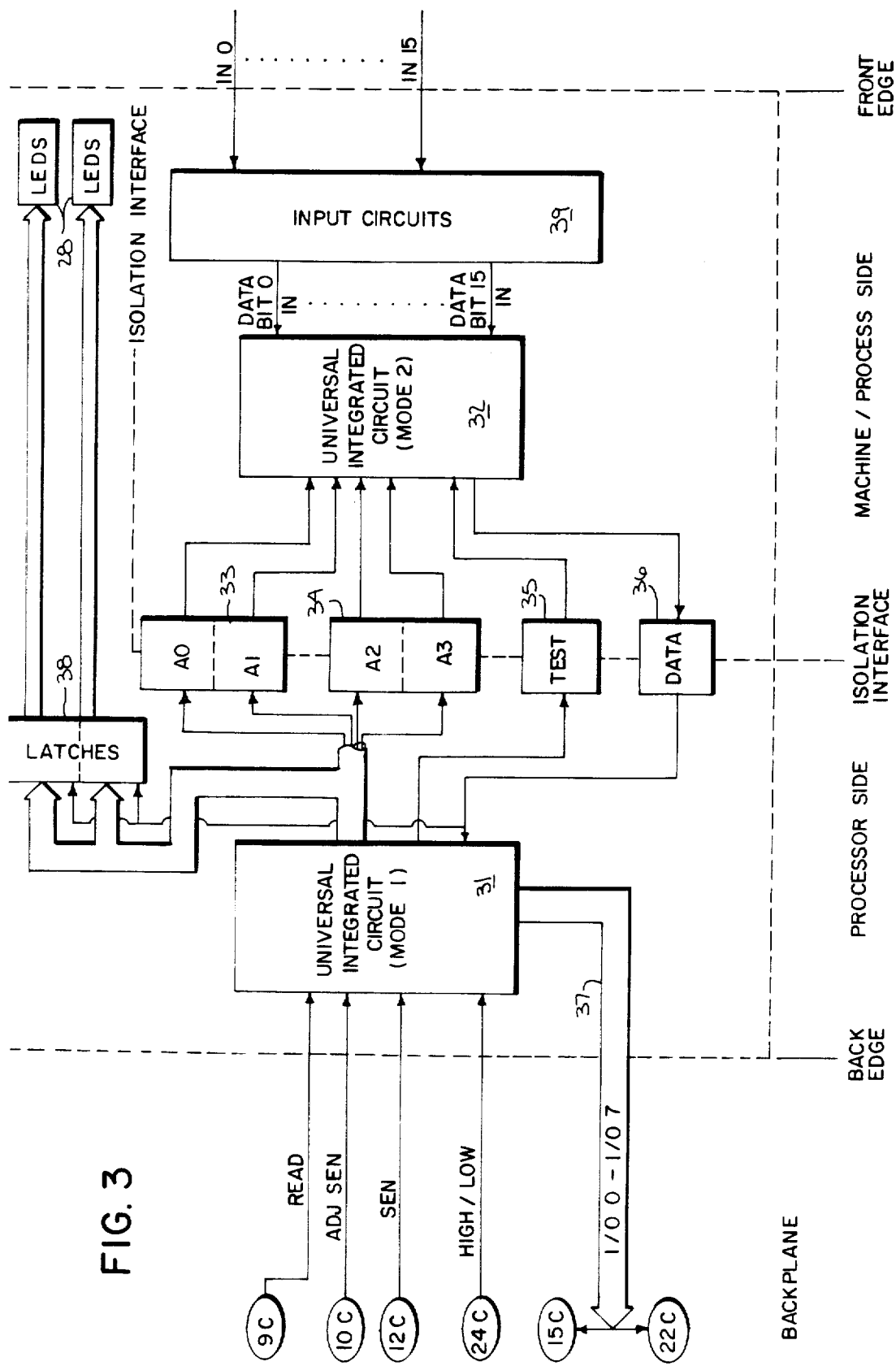
FIG. 3 is a block diagram of a DC input module of the present invention.
Figure 4:
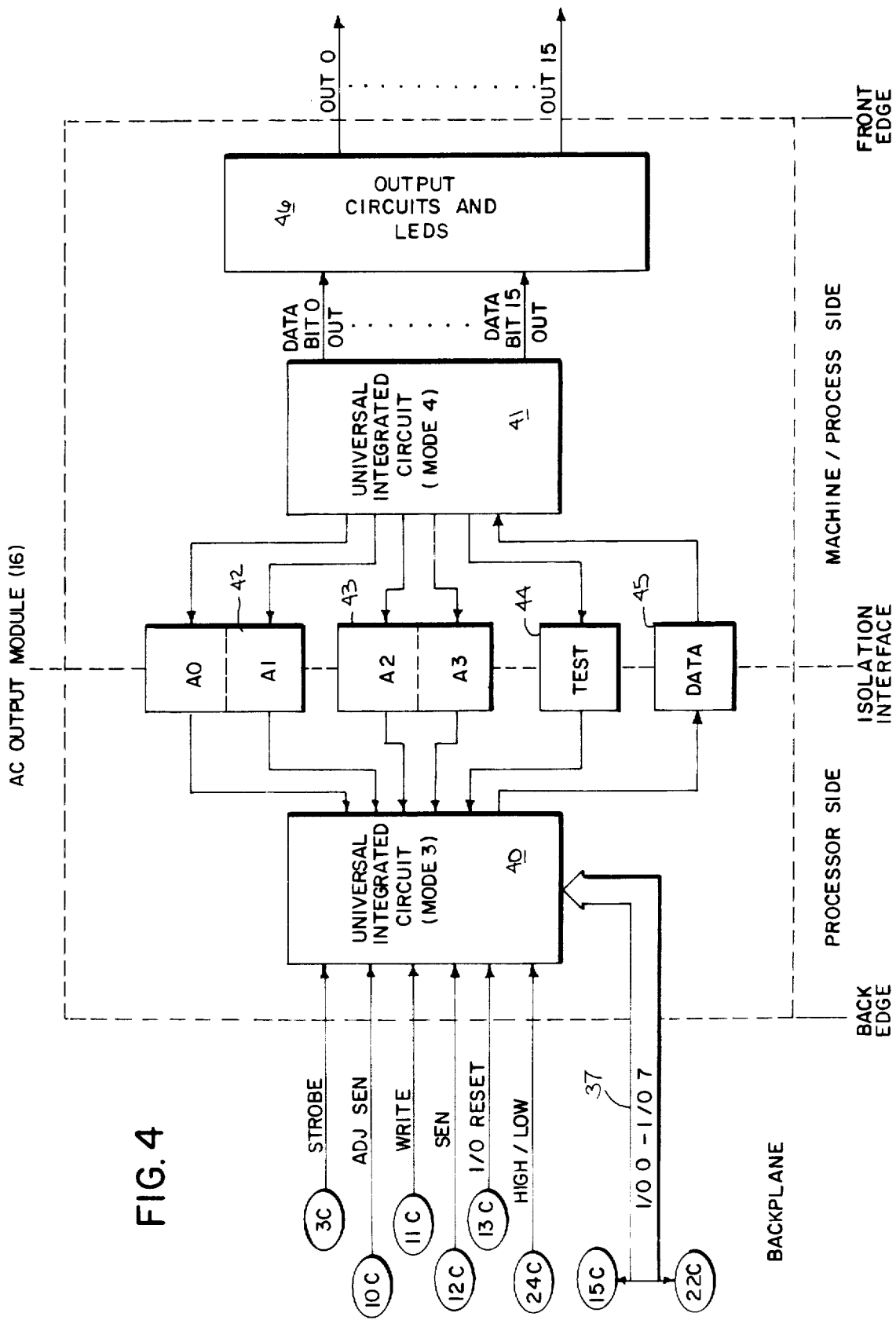
FIG. 4 is a block diagram of an AC output module of the present invention.

The four modes of operation can be generally distinguished by considering FIGS. 3 and 4. The DC input module 15 is seen in FIG. 3. A pair of integrated circuits (IC's) 31, 32 of the invention are seen on opposite sides of the optical coupling circuits 33-36 which provide the isolation interface. The first universal integrated circuit (universal IC) 31 receives backplane control signals, such as READ and SEN (slot enable) from the main processor unit 11 through "pin 9C" and "pin 12C", respectively, of the back edge connector on the backplane circuit board 18, the pins being represented schematically in FIG. 3. This IC 31 also connects to "pins 15C-22C" of the back edge connector to transmit data on lines I/O 0-I/O 7 of an I/O data bus 37. In the opposite direction, this IC 31 is coupled through four address lines (A0-A3) and two dual-channel optical coupling circuits 33,34 to the second universal IC 32. This second IC 32 responds to signals on the address lines A0-A3 to couple DATA signals through a single-bit channel, optical coupling circuit 36. For purposes of error-checking, to be explained further below, the first IC 31 also transmits a fifth signal, referred to as a TEST signal, which is coupled through a single-bit channel, optical coupling circuit 35. Lines A0-A3 from the first IC 31 and the DATA line are also connected to latches 38 seen in FIG. 3 to operate the LED status indicators 28 that were previously seen in FIG. 1.

The first universal IC 31, by virtue of its position on the processor side of the isolation interface, and by virtue of its inclusion in an input module, performs functions which shall be collectively referred to as MODE 1 operation. Similarly, the functions of the second IC 32 shall be collectively referred to as MODE 2 operation. Although operating in different modes, these two integrated circuits 31, 32 have the same set of subcircuits, with different subcircuits being selected for operation in the two respective modes. When operated in MODE 1, the first IC 31 becomes a "master" or "controlling" circuit in relation to the second IC 32, because it initiates the transfer of I/O status data across the isolation interface. The second IC 32 is continuously updating the status of input devices 26 by receiving input signals on sixteen lines designated IN 0-IN 15. A group of sixteen input circuits 39 conditions the input signals for reception by the second IC 32. The second IC 32, however, does not transmit this data across the isolation interface until addressed by the first IC 31, so it is a "slave" or "controlled" circuit.

Figure 21:
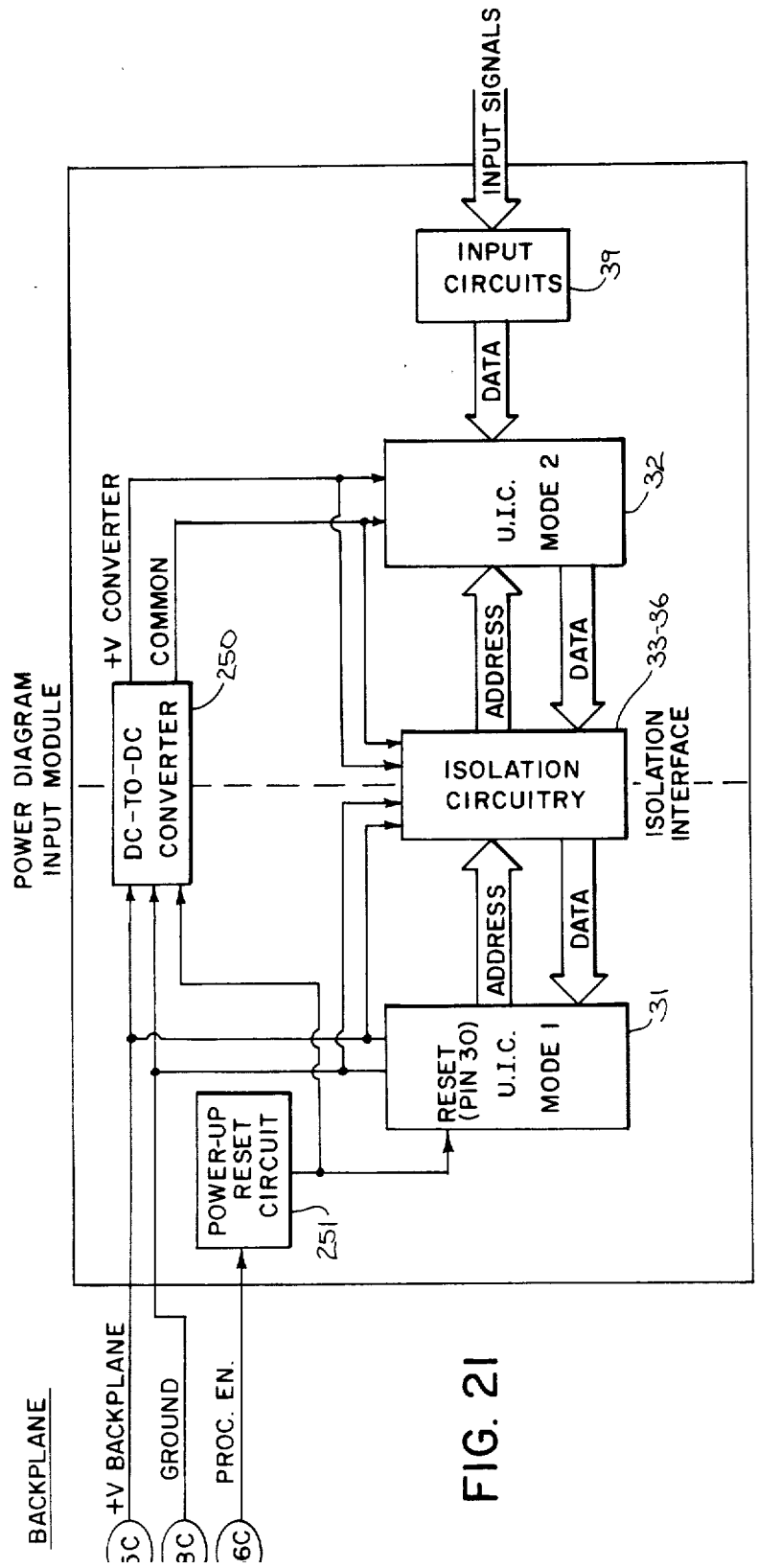
FIG. 21 is a block diagram of a power circuit for the DC input module of FIG. 3.

Power is supplied to the IC's 31 and 32 from the backplane through "pin 5C" and "pin 8C" of the back edge connector, as shown in FIG. 21. Power is transmitted across the isolation interface to the second IC 32 using a DC-to-DC converter 250 seen in FIG. 21. In applying power to the IC's 31 and 32, a processor-controlled enable (PROC. EN.) signal is transmitted through "pin 36C" to a power-up reset circuit 251 that holds the master or controlling IC 31 in a reset condition until power at the DC supply voltage (in this case +5 DC volts) is established on the backplane. Otherwise, the master or controlling IC 31 might start operation before sufficient power is available to the IC 32 on the other side of the DC-to-DC converter 250.

Figure 22:
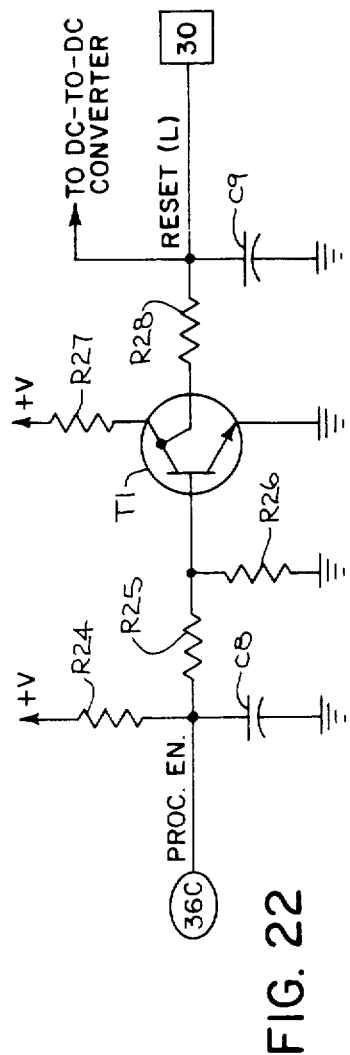
FIG. 22 is a detail schematic of a power-up reset circuit seen in FIG. 21.

As seen in FIG. 22, the power-up reset circuit 251 includes resistors R24–R28, capacitors C8 and C9 and an NPN transistor T1. This circuit 251 generates a RESET (L) pulse, which switches low at "pin 30" of the IC 31 to hold it reset while power is being established on the backplane, and then switches high to remove the reset so that IC 31 can begin its operation. As the supply voltage begins rising from zero, the PROC. EN. signal goes low to switch off transistor T1 and generate the logic low reset signal. When the full supply voltage (+V) is present, transistor T1 is switched on, charging capacitor C9 to remove the logic low reset signal.

Referring next to FIG. 4, a third IC 40, with the same subcircuits as the integrated circuits in FIG. 3 is operated in MODE 3 by activating a different subset of its total complement of subcircuits. This third IC 40 is connected to receive backplane signals and data signals from the main processing unit 11 through pins designated with a "C" suffix in FIG. 4. The third IC 40 is also connected in an opposite direction to receive addresses from a fourth IC 41. The four-bit addresses are generated by the fourth IC 41 and coupled through lines A0–A3 and two dual-channel optical coupling circuits 42, 43 to the third IC 40. The third IC 40 also receives the TEST signal through a single-channel optical coupling circuit 44. In response to the address and TEST signals, the third IC transmits serial data through a DATA single-channel optical coupling circuit 45.

The fourth IC 41 operates in MODE 4, which is similar to MODE 1 operation for the first IC 31 in FIG. 3. It is similar in the sense that the fourth IC 41 controls the transfer of data across the isolation interface, even though the fourth IC 41 is located on the opposite side of the isolation interface compared to the first IC 31. Also, in contrast to the first IC 31, the fourth IC 41 transmits output status signals to control output devices rather than transmitting input status signals to the backplane. The fourth IC 41 couples these output signals to the output circuits 46 in FIG. 4, which include LED status indicators 28 previously seen in FIG. 2. It should be noted that this manner of controlling LED status indicators 28 is different from that previously described relative to FIG. 3.

In contrast to the input module 15, the IC 41 on the machine/process side of the output module 16 is the master or controlling circuit. The main processor unit 11 couples output data to the other IC 40 on a periodic basis determined by the frequency of execution of its I/O scan operation. There the output status data waits for transfer across the isolation interface when addressed by the controlling IC 41. For an output module, the power-up reset circuit 251 of FIGS. 21 and 22 is connected to delay the start-up of the DC-to-DC converter until sufficient power is established on the backplane.

Before describing the details of the universal integrated circuit, the interfacing circuits on the I/O modules such as the optical coupling circuits, the input circuits and the output circuits will be described.

Figure 5:
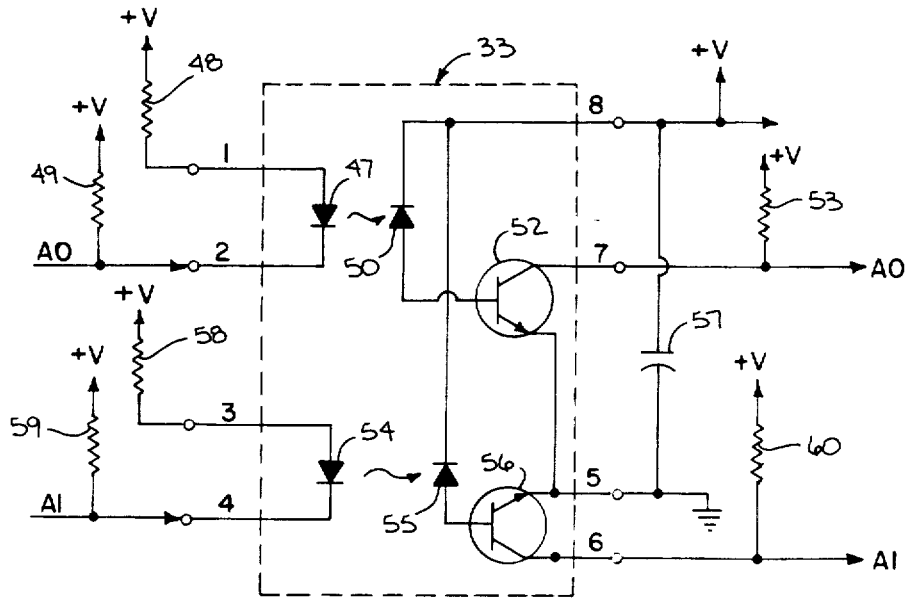
FIG. 5 is an electrical schematic diagram of one of the optically coupled circuits seen in FIG. 3.

The details of a dual-channel optical coupling circuit 33 are shown in FIG. 5. A light-emitting diode 47 in this integrated circuit is connected internally across "pin 1" and "pin 2", both of these pins being pulled high through external pull-up resistors 48, 49. Line A0 connects to "pin 2" and when a logic low signal is present at "pin 2", it is also present at the cathode of the diode, which causes the diode to conduct and emit a ray of light. A photon detector 50 is connected through "pin 8" to the DC supply voltage (+V). In its non-conducting state, the photon detector 50 blocks any signal from the base of an NPN transistor 52. When light is detected, the photon detector 50 applies an electrical signal across the base-emitter junction of the transistor 52 to cause it to conduct current. The collector of this transistor is connected to "pin 7" to provide an output signal on line A0. The A0 line is pulled high through a resistor 53 on the output side when the transistor 52 is not conducting, and the A0 line is pulled low when the transistor 52 is turned on. Thus, a logic low input signal on line A0 into "pin 2" causes a logic low output signal on line A0 from "pin 7".

The description of FIG. 5 thus far would also apply to the individual optical coupling circuits 35, 36, 44 and 45 discussed in relation to FIGS. 3 and 4. Since the circuit in FIG. 5 is a dual-channel circuit, it has a second light-emitting diode 54, a second photon detector 55 and a second NPN transistor 56 connected between "pin 3", "pin 4" and "pin 6" to couple an address signal on line A1. These pins are connected through external resistors 58–60 to the DC supply voltage (+V). The emitters of the two transistors 52, 56 are connected together to ground through "pin 5". A capacitor 57 is connected externally from "pin 8" to "pin 5" to protect the internal elements of the coupling circuit from noise signals that might be received through the power supply circuitry.

It should now be understood how the logic signals on the input and output sides of the optical coupling circuits in FIGS. 3 and 4 are physically and electrically isolated from each other, while also being optically coupled to interface two sections of an electrical system.

Figure 6:
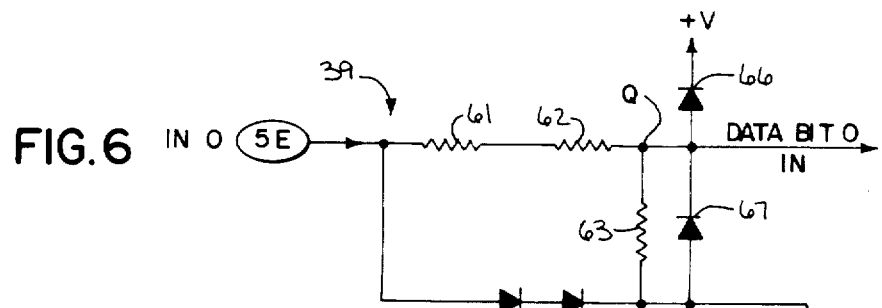
FIG. 6 is an electrical schematic diagram of one of the input circuits seen in FIG. 3.

FIG. 6 shows one of the sixteen input circuits 39 represented in FIG. 3. A DC input signal IN 0 is received through a front edge terminal 5E and is coupled through a voltage divider network of three resistors 61–63. The resistors 61–63 are selected according to the voltage range of the input module which may be from 10 DC volts to 24 DC volts or from 20 DC volts to 60 DC volts. A pair of diodes 64, 65 are connected in series from terminal 5E to ground to establish a minimum current that must be drawn before current is drawn by the resistors. A second pair of diodes 66, 67 are connected across the signal line to limit the range of the voltage at junction Q of the voltage divider network to within 0.6 volts of the logic level range of 0–5 DC volts. The signal at junction Q becomes the logic level signal DATA BIT 0 IN which is received by the second IC 32 as seen in FIG. 3.

Figure 7:
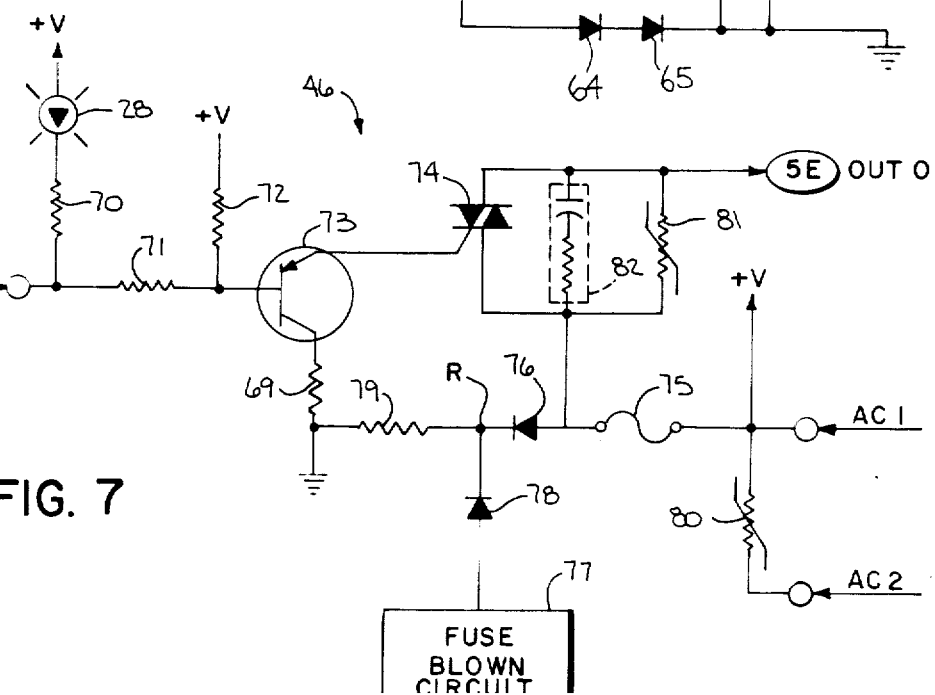
FIG. 7 is an electrical schematic diagram of one of the output circuits seen in FIG. 4.

FIG. 7 shows one of the sixteen output circuits 46 in FIG. 4, where the DATA BIT 0 OUT logic-level output signal is received. One of the status LED's 28 is connected in series with a resistor 70 to the DC supply voltage (+V). Thus, when the digital output signal is low, which is its active state, current flows and the status LED 28 is illuminated. THE DATA BIT 0 OUT line is also connected through a resistor 71 to the base of a PNP transistor 73. The emitter of the transistor 73 is connected to a gate input on an AC load triac 74. The triac 74 is connected between the output signal line OUT 0 and line AC 1 from the high side of an external AC source. When the triac 74 is "off" there is a voltage of 120 AC volts across it. Also, a DC voltage is supplied through a fuse 75 to provide a 5-volt potential where the emitter is connected to the gate. When the DATA BIT 0 line goes low, current flows through resistors 71 and 72, which provides a lower voltage at the base than at the emitter. This provides the forward bias to switch on the transistor 73, which turns on the triac 74 to supply a 120-volt AC signal to the OUT 0 line.

The triac 74 is connected to line AC 1 through the fuse 75 to prevent excessive current from being drawn by the AC output device under a fault condition. The DC voltage is supplied through the fuse 75 and a first diode 76 also operates a "fuse blown" circuit 77. When a signal is present at junction R that is a diode drop below the DC supply voltage, no current will be drawn through a second diode 78 from the "fuse blown" circuit. When the fuse 75 is interrupted, however, the voltage at junction R goes low and current is drawn through this second diode 78 and a resistor 79 to ground to illuminate a "fuse blown" LED (not shown) in the "fuse blown" circuit 77.

The AC output circuit 46 also contains several other protective components. A first varistor 80 is connected between the high side and low side of the AC supply voltage for surge suppression; a second varistor 81 is connected across the triac 74 for surge suppression; and an RC snubber circuit 82 is connected across the triac 74 to maintain a desired phase relationship when alternating current is being supplied to inductive output devices.

Figure 8:
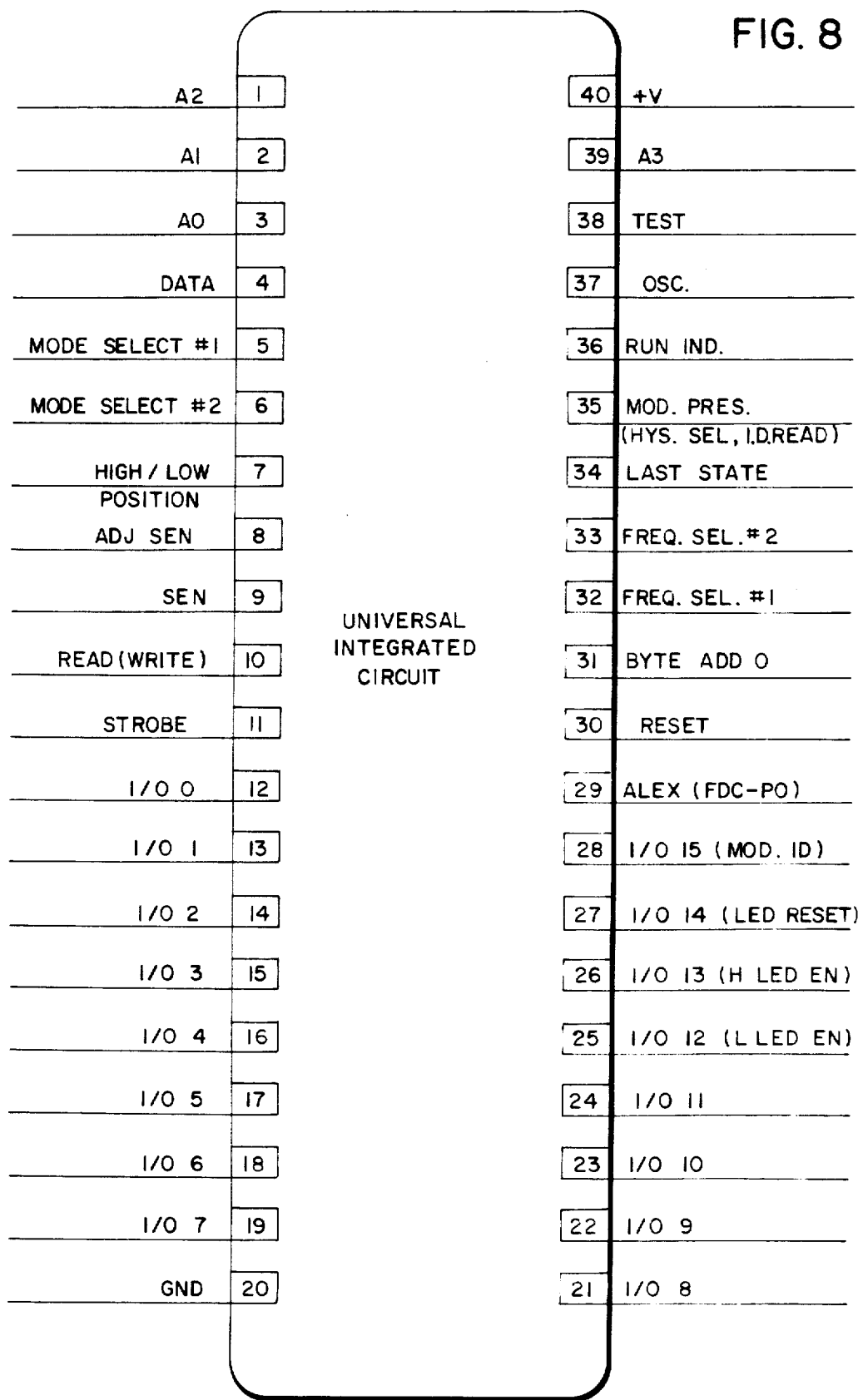
FIG. 8 is a pin-out diagram of the universal integrated circuit seen in FIGS. 3 and 4.

As further background for the description of the universal IC's used in the four different modes of I/O operation, it is helpful to review the input signals to the IC and the output signals from the IC. FIG. 8 shows the outline of the circuit package, which is a 40-pin dual in-line package (DIP). The pin functions are described in Table 1 below and are represented by their labels in FIG. 8. Material in parenthesis relates to a second function.

TABLE 1

| FUNCTIONAL PIN DESCRIPTION | | |
|---|---|---|
| Pin No. | Label | Pin Signal Function |
| 1 | A2 | I/O Address-3rd Bit |
| 2 | A1 | I/O Address-2nd Bit |
| 3 | A0 | I/O Address-1st Bit |
| 4 | DATA | I/O serial data |
| 5–6 | MODE SEL. #1 & #2 | Two bits to select one of four modes of IC operation |
| 7 | HIGH/LOW POSITION | Selects order of I/O byte transfer based on signal generated from backplane |
| 8 | ADJ SEN | Adjacent I/O slot enable |
| 9 | SEN | This I/O slot enable |

TABLE 1-continued

| FUNCTIONAL PIN DESCRIPTION | | |
|---|---|---|
| Pin No. | Label | Pin Signal Function |
| 10 | READ(WRITE) | Read (or write) signal from backplane |
| 11 | STROBE | Strobe signal from backplane |
| 12–19 | I/O 0– I/O 7 | Eight bits of I/O parallel data from either backplane or I/O devices |
| 20 | GND | Ground |
| 21–28 | I/O 8– I/O 15 | High order eight bits of I/O parallel data for I/O devices |
| 25 | (L LED EN) | (Enables latch controlling lighting of low order set of LED's.) |
| 26 | (H LED EN) | (Enables latch controlling lighting of high order set of LED's.) |
| 27 | (LATCH RESET) | (Resets LED latch). |
| 28 | (MOD. ID) | An I.D. signal for an input module |
| 29 | ALEX (FDC/PO) | Invokes a second mode of controlling I/O data transfer. (Selects fast response time for DC inputs or pulsed output mode for AC outputs.) |
| 30 | RESET | Circuit reset signal. |
| 31 | BYTE ADDRESS 0 | Enables transfer of two bytes per I/O module—controls byte selection. |
| 32–33 | FREQ.SEL. #1 & #2 | Two bits to select 1 of 4 frequencies. |
| 34 | LAST STATE | Selects last state function for I/O devices upon fault. |
| 35 | MOD.PRES. (HYS. SEL.) (I.D. READ) | Input module identification signal. (Input enable signal.) (Output module identification signal.) |
| 36 | RUN IND. | "System go" indicator |
| 37 | OSC. | Input for RC circuit signal |
| 38 | TEST | Signal sent through TEST optical coupling circuit |
| 39 | A3 | I/O Address - 4th and highest bit |
| 40 | +V | Supply voltage in the range 4.50 to 7.00 DC volts |

Figure 9:
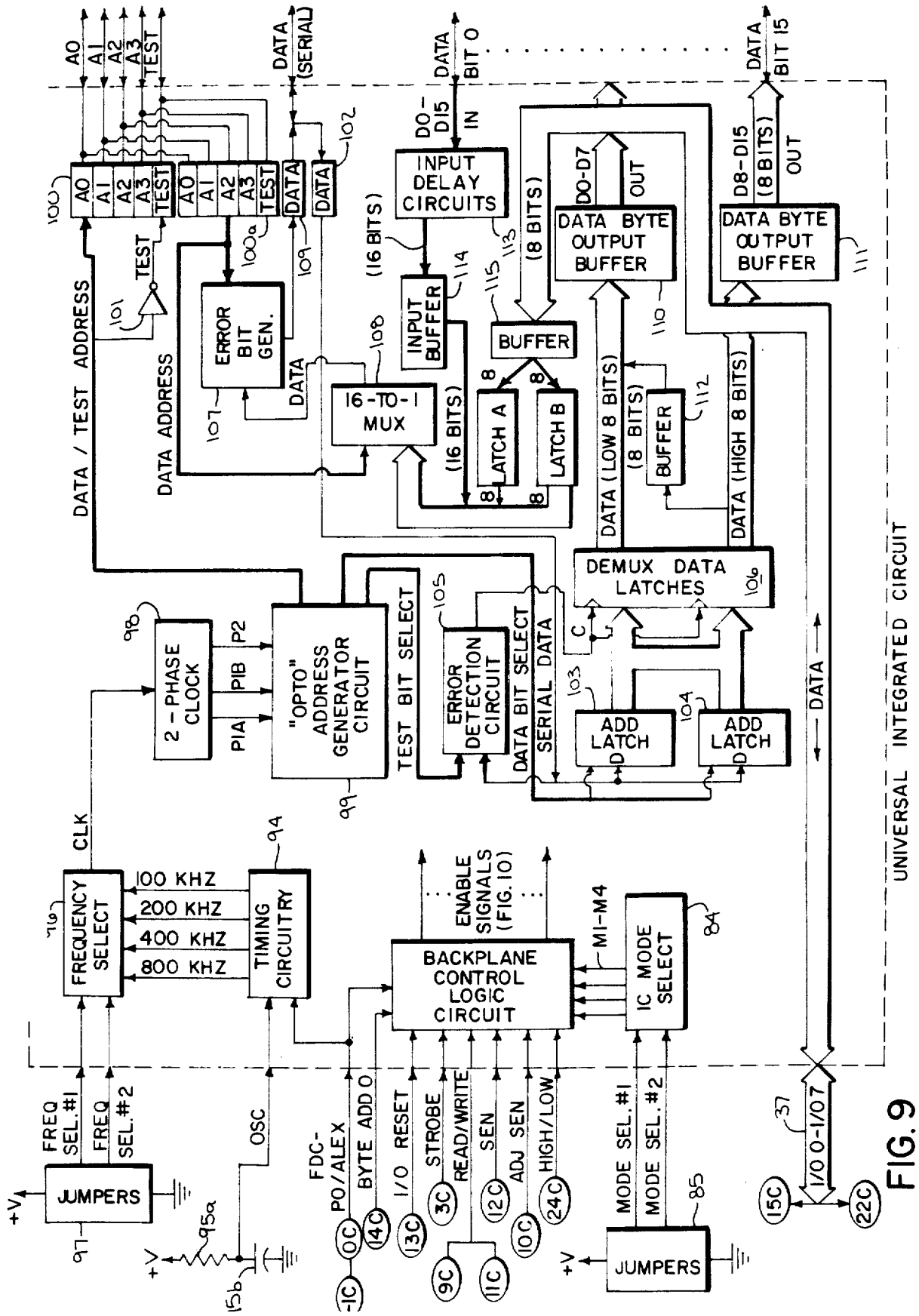
FIG. 9 is a DATA FLOW block diagram of the universal integrated circuit seen in FIGS. 3 and 4 showing its internal address and data bus connections.

The subcircuits in the universal IC are shown in FIG. 9. The STROBE, READ, WRITE and the other backplane control signals are coupled from pins (circled) of the backplane connector through the pins seen in FIG. 8 to a backplane control logic circuit 83. This subcircuit will be described in more detail below, but generally it responds to the backplane control signals to selectively activate or enable the various other subcircuits within the universal IC.

Figure 12:
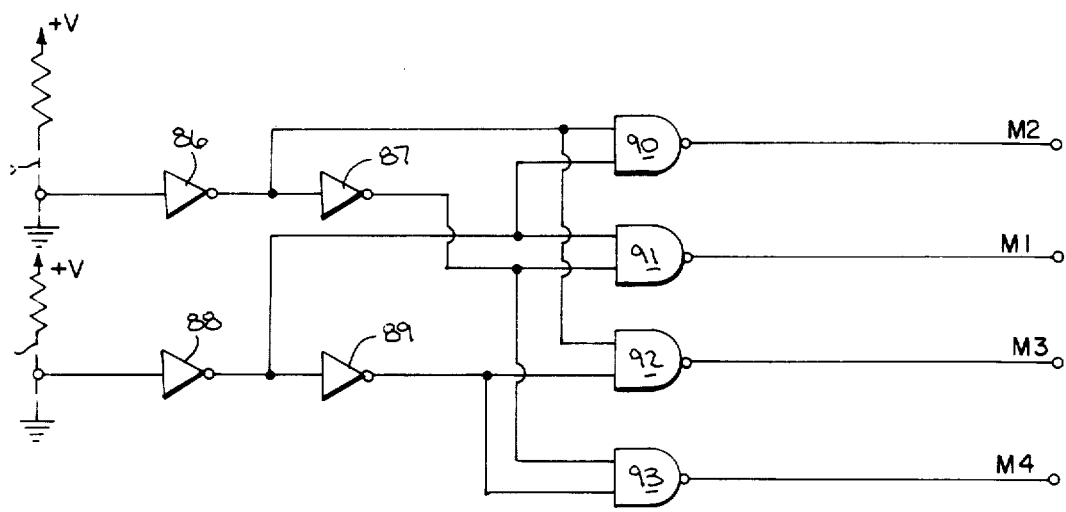
FIG. 12 is an electrical schematic diagram of an IC mode select circuit represented in FIGS. 9 and 10.

The backplane control logic subcircuit 83 also receives signals from an IC mode select circuit 84. This circuit 84 receives two binary-coded signals, MODE SELECT #1 and #2. Each MODE SELECT line is either pulled up to the positive DC supply voltage on the I/O module or is connected to ground. This provides each of the two MODE SELECT signals with two possible logic states. Four possible signal combinations are possible. Each combination selects a respective one of the four modes of IC operation. According to the identity of the I/O module (input module or output module) and the position of the IC (processor side or machine side) these signals are generated by connecting "pin 5" and "pin 6" of the IC with jumpers 85 as seen best in FIG. 12. The pins are connected to the DC supply voltage to generate a logic high signal (1) or to ground to generate a logic low (0) signal. There are thus four possible binary combinations (00, 01, 10, 11) of these two signals. These signals are coupled through the four inverters 86–89 to the four NAND gates 90–93 as illustrated in FIG. 12 to generate the Mode 1 (M1), Mode 2 (M2), Mode 3 (M3) and Mode 4 (M4) select signals.

Referring again to FIG. 9, the IC also includes timing circuitry for generating clock signals at the four operating frequencies, 100 kilohertz (kHz), 200 kilohertz, 400 kilohertz and 800 kilohertz. This circuitry 94 includes a 1.6-megahertz (MHz) oscillator curcuit, which receives a triggering signal through the OSC. input (pin 37 in FIG. 8). As seen in FIG. 9 the OSC. input is pulled high through a resistor 95a and is connected to ground through a capacitor 95b. The capacitor 95b repeatedly charges to a threshold level and is then discharged to generate timing pulses. The 1.6-MHz signal is divided by counters (not shown) to generate signals at frequencies from 100 kHz to 800 kHz. When the IC is operated in MODE 2 or MODE 4, it can receive a signal through an FDC-PO input (IC pin 29 in FIG. 8) which is pulled high or low to select special timing for signals to or from the I/O devices.

The clock frequencies generated by the timing circuitry 94 are coupled to a frequency select circuit 96. FREQUENCY SELECT inputs #1 and #2 (IC pins 32 and 33 in FIG. 8) receive logic signals derived from the DC supply and ground using another set of jumpers 97 seen in FIG. 9. These signals select which frequency will become the frequency of the clock (CLK) signal, which is coupled from the frequency select circuit 96 to a two-phase clock circuit 98. This latter circuit 98 develops phased clock signals P1 and P2 having a square waveform with a 25% duty cycle, i.e. a pulse width lasting 25% of the duration of one period of the waveform. The P1 signal is duplicated to provide two signals P1A and P1B of the same phase as P1. The P2 signal is 180° out of phase with the P1 signals. If the falling edge of the P1 signal occurs at the beginning or end of a time period T, then the falling edge of the P2 signal will occur midway through that time period.

The two-phase clock circuit 98 supplies the P1A, P1B and P2 clock signals to an "opto" address generator circuit 99. As its name suggests, this circuit 99 transmits a sequence of addresses to the optical coupling circuits 33, 34 and 42, 43 described earlier in FIGS. 3 and 4. For each address, four binary DATA ADDRESS signals are transmitted from the "opto" address generator circuit 99 through an address output buffer 100 to lines A0–A3 going to the optical coupling circuits. The opto address generator circuit 99 also generates TEST addresses, which are coupled in a second address generating sequence through the address output buffer 100. During this second address-generating sequence, a fifth signal, referred to as the TEST signal, is transmitted through an inverter 101 and a fifth gate in the output buffer 100 to the TEST optical coupling circuit 35, 44. As the opto address generator 99 executes its two address-generating sequences, it receives serial bits of data through a DATA input buffer 102. During the first sequence, data is coupled to serial inputs (D) on two serial-to-parallel addressable data latches 103, 104 seen in FIG. 9. During the second sequence, three error bits are received through the DATA input buffer gate 102 and are directed to a serial data input on an error detection circuit 105.

The opto address generator 99 is only active when the IC is in one of its two master or controlling modes of operation (MODE 1 and MODE 4). In the other two modes of operation (MODE 2 and MODE 3), address signals are received on lines A0–A3, which are coupled by an address input buffer 100a to an error bit generating circuit 107. Also in MODE 2 and MODE 3 the TEST signal is coupled through a TEST gate in the input buffer 100a to the error bit generating circuit 107. The error bit generating circuit 107 also receives individual bits of data from a 16-to-1 MUX (multiplexing) circuit 108 and transmits these bits through a DATA (serial data) output buffer gate 109. An incoming four-bit DATA ADDRESS is coupled to four address inputs on the 16-to-1 MUX circuit 108 to select the bit that is then transmitted to the error bit generating circuit 107.

During the first address-generating sequence, which is the data transfer sequence, data from the 16-to-1 MUX circuit 108 passes without alteration through the error bit generating circuit 107. Addresses are coupled to both the error bit generating circuit 107 and to the 16-to-1 MUX circuit 108, with the addresses to the 16-to-1 MUX circuit 108 controlling the data coupled to the DATA output buffer 109. During the second address-generating sequence, referred to as the TEST sequence, the receipt of an active TEST signal by the error bit generating circuit 107 allows the address signals to generate certain predetermined error bits to the DATA output buffer 109. Thus, the data bits received from the 16-to-1 MUX circuit are not passed through the error bit generator circuit 107 during the TEST sequence.

The TEST sequence is executed to assure that none of the optical coupling circuits has failed, which would cause invalid data to be received. The master or controlling IC generates addresses, which if received by the other IC on the I/O module, will yield the predetermined error bits. If one of the address coupling circuits or the data coupling circuit has failed, the expected error bits will not be received.

As serial data is received during the data transfer sequence, it is stored as parallel data in addressable latches 103, 104 in FIG. 9. The data is directed to the correct latch output by address signals on the DATA BIT SELECT lines originating at the opto address generator circuit 99. While the opto address generator circuit 99 is generating the data addresses, it is also enabling the addressable latches 103, 104 to receive the data that is returned through the DATA buffer gate 102. The enable signals are timed by the P2 clock signal which is received at one input of the opto address generator circuit. The latches 103, 104 are enabled for about five microseconds during a twenty microsecond period when a valid address is being coupled across the isolation interface (assuming a 100 kHz clock (CLK) frequency).

During the TEST sequence, the error detection circuit will test the error bits logically, and if the bits are correct, it will transmit a clock (C) signal to transfer sixteen bits of data from the addressable data latches 103, 104 to a pair of DEMUX data latches 106. If an error is detected, the data is not transferred to the DEMUX data latches 106 or to the data byte output buffers 110, 111.

Data is transmitted through only one of the data byte output buffers 110 when the IC is operated in MODE 1. In MODE 1, this data will be transferred through the backplane 18 to the main processor unit 11 through lines I/O 0-I/O 7 of the eight-bit I/O data bus 37. To provide for this transfer, the low byte DEMUX data latch 106 in FIG. 9 is connected to data byte output buffer 110, which is connected by pins 12-19 in FIG. 8 to lines I/O 0-I/O 7 in the back. plane. A high byte DEMUX data latch 106 is also connected to data byte output buffer 110 through an intermediate buffer 112. This allows for a sequential transfer of two bytes of I/O status data to the backplane through the data byte output buffer 110.

In MODE 4, data is transmitted through both data output buffers 110, 111. Pins 12-19 in FIG. 8 couple the data byte output buffer 110 to lines DATA BIT 0-7 (decimal) controlling eight output devices. Pins 21-28 in FIG. 8 couple the data byte output buffer 111 in FIG. 9 to lines DATA BIT 8-15 (decimal) controlling eight more output devices. When operating in MODE 4, the high byte from the DEMUX data latches 106 in FIG. 9 is coupled through the data byte output buffer 111 rather than through the intermediate buffer 112. By arranging the connection of pins 12-19 in FIG. 8, the data byte output buffer 110 can be connected either to control output devices or to communicate with the backplane according to the mode of operation.

Still referring to FIG. 9, in MODE 2, input status data is received on DATA BIT IN lines 0-15 (decimal), also seen in FIG. 3. Pins 12-19 and pins 21-28 in FIG. 8 connect these lines to input delay circuitry 113 in FIG. 9, which is coupled through a sixteen-bit input buffer 114 to sixteen data inputs on the 16-to-1 MUX circuit 108. This allows sixteen bits of input status data D0-D15 to be coupled to the 16-to-1 MUX circuit 108, where it waits for transfer across the isolation interface to an IC that is operating in MODE 1.

In MODE 3, output status data is received in two sequential bytes over the I/O data bus 37. Therefore, pins 12-19 in FIG. 8 are coupled to a backplane buffer 115 in FIG. 9, which is connected to a pair of eight-bit latch circuits LATCH A and LATCH B. One byte is directed through the backplane buffer 115 to LATCH A, while the other byte is directed through the buffer 115 to LATCH B. After the two bytes have been arranged as sixteen parallel bits they are transferred to the inputs of the 16-to-1 MUX circuit 108. From there, the output status data is transmitted serially across the isolation interface to the IC 41 operating in MODE 4.

Some of the circuitry in FIG. 9 is active in some of the modes of IC operation and inactive in complementary modes of operation; some of the circuitry is active or inactive in only one mode of operation and some of the circuitry is active in all modes of operation. To provide a quick reference each circuit in FIG. 9 is listed in Table 2 below with an indication whether it is enabled (E) or disabled (D) for each mode of IC operation.

TABLE 2

| | Active Modes for IC Circuitry | | | |
|---|---|---|---|---|
| Circuit | MODE 1 (FIG. 3) | MODE 2 (FIG. 3) | MODE 3 (FIG. 4) | MODE 4 (FIG. 4) |
| Backplane Control Logic | E | D | E | D |

TABLE 2-continued

| | Active Modes for IC Circuitry | | | |
|---|---|---|---|---|
| Circuit | MODE 1 (FIG. 3) | MODE 2 (FIG. 3) | MODE 3 (FIG. 4) | MODE 4 (FIG. 4) |
| IC Mode Select | E | E | E | E |
| Timing Circuitry | E | E | E | E |
| Freq. Select | E | D | D | E |
| 2-Phase Clock | E | D | D | E |
| Opto Address Gen. | E | D | D | E |
| Output Buffer A0-A3 & TEST | E | D | D | E |
| Output Buffer DATA | D | E | E | D |
| Input Buffer* A0-A3 & TEST & DATA | E | E | E | E |
| Error Bit Generator | D | E | E | D |
| 16-to-1 MUX | D | E | E | D |
| Error Detection | E | D | D | E |
| Addressable Latches | E | D | D | E |
| DEMUX Data Latches | | | | |
| (Low Byte) | D/E | E | E | E |
| (High Byte) | E | E | E | E |
| Output Buffer (D0-D7) | E | D | D | E |
| Output Buffer (D8-D15) | D | D | D | E |
| Inter. Buffer | E | D | D | D |
| Backplane Buffer* | E | E | E | E |
| Latches A & B | D | D | E | D |
| Input Delay Circuits | D | E | D | D |
| Input Buffer | D | E | D | D |

*Not disabled even when inactive

Figure 10:
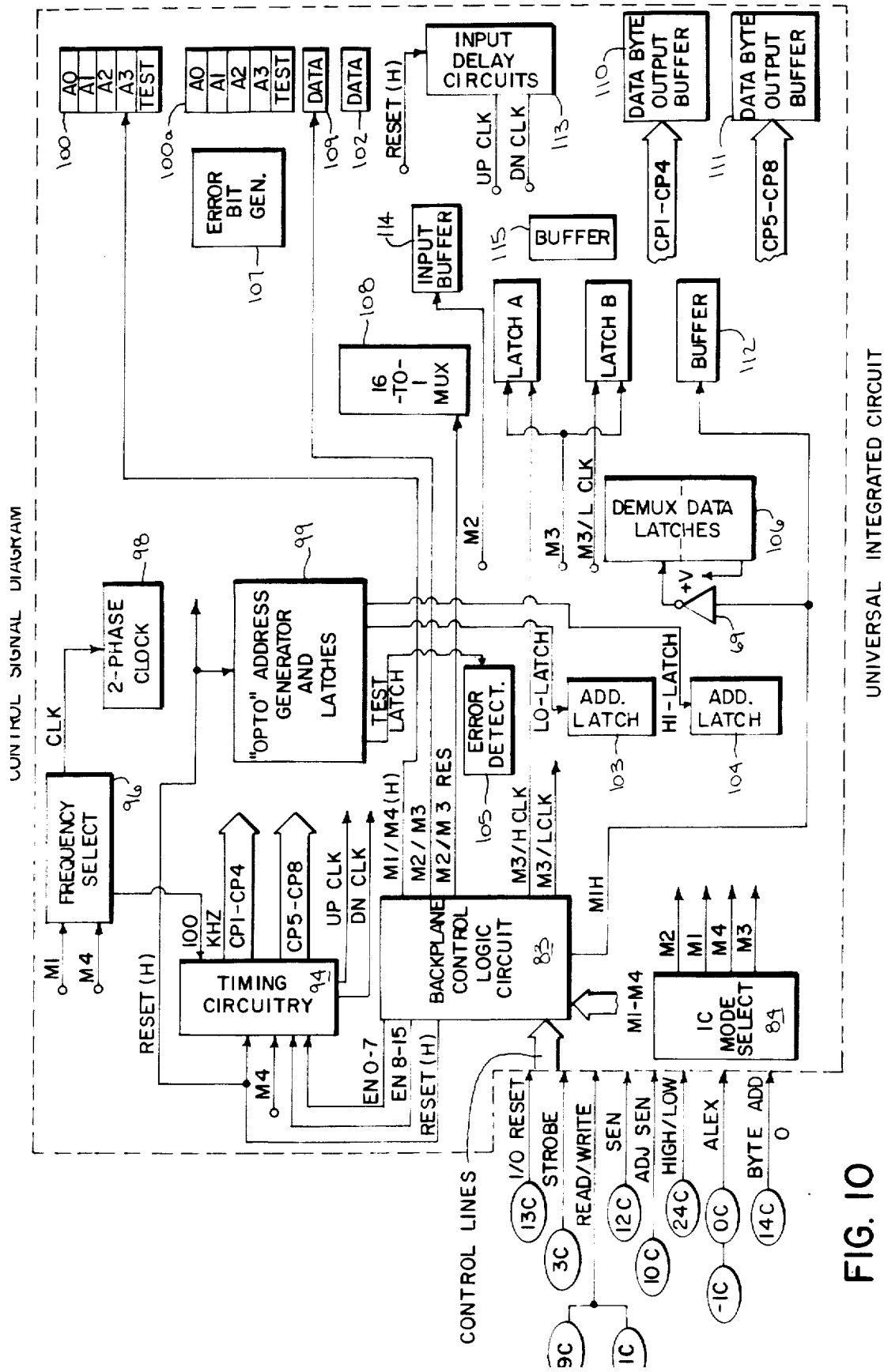
FIG. 10 is a CONTROL SIGNAL block diagram of the universal integrated circuit seen in FIGS. 3 and 4.

FIG. 10 shows the control lines and signals by which the various circuits in the IC package are enabled according to the mode of IC operation. The MODE 1 signal and the MODE 4 signal from the IC mode select circuit 84 are used to enable the frequency select circuit 96 during operation in those two modes. The MODE 4 signal is also coupled to a portion of the timing circuitry 94 that controls the pulse output operation. The MODE 2 signal is used to enable the input buffer 114 during MODE 2 operation, and the MODE 3 signal is used to enable LATCH A and LATCH B in MODE 3 operation.

The four mode select/enable signals are also coupled to the backplane control logic circuit 83 to derive combined logic signals such as a MODE 1/MODE 4 (M1/M4) logic high (H) signal, which enables the ADDRESS and TEST output buffer 100. A MODE 2/MODE 3 (M2/M3) signal enables the DATA output buffer 109 during operation in MODE 2 and MODE 3. A MODE 2/MODE 3 reset (M2/M3/R) signal enables the sixteen-to-one MUX circuit 108 in MODE 2 and MODE 3, while disabling the circuit in MODE 1 and MODE 4. A MODE 3/High Byte Clock (M3/HCLK) signal and a MODE 3/Low Byte Clock (M3/LCLK) signal are used to clock two bytes of data into LATCH A and LATCH B in sequence while they are enabled by the inverted form of the MODE 2 signal.

Data is coupled to the backplane and to the I/O devices from the DEMUX data latches 106 through data byte output buffers 110, 111 using other control signals. In MODE 1 the intermediate buffer 112 mentioned above in relation in FIG. 9 is enabled by the MODE 1/High Byte (M1H) signal to allow data transfer from the high byte DEMUX data latch 106 to the low byte output buffer 110. The high byte DEMUX data latch 106 is always enabled, through a connection to the DC supply voltage, because its outputs can be effectively disabled by disabling the intermediate buffer 112 and the output buffer 111. The low byte DEMUX data latch 106 is enabled by through an inverter 69 and the M1H line. When the M1H signal is high and inactive relative to the intermediate buffer 112, its inverted state will enable the data latch 106 that handles a low byte of data.

Other control signals are developed by the backplane control logic circuit 83 to enable the data byte output buffers 110 and 111. These are the EN 0-7 and the EN 8-15 signals, which control lines CP1-CP8 through the timing circuitry 94 seen in FIG. 10, and the lines CP1-CP8 in turn control the enabling of the output buffers 110, 111.

Another signal seen in FIG. 10 is the RESET (H) signal, which is used to reset the timing circuitry 94, the opto address generator 99 and the input delay circuits 113 on the IC. The input delay circuits 113 also receive the UP CLK and DN CLK timing signals, which are developed by the timing circuitry 94.

Figure 11:
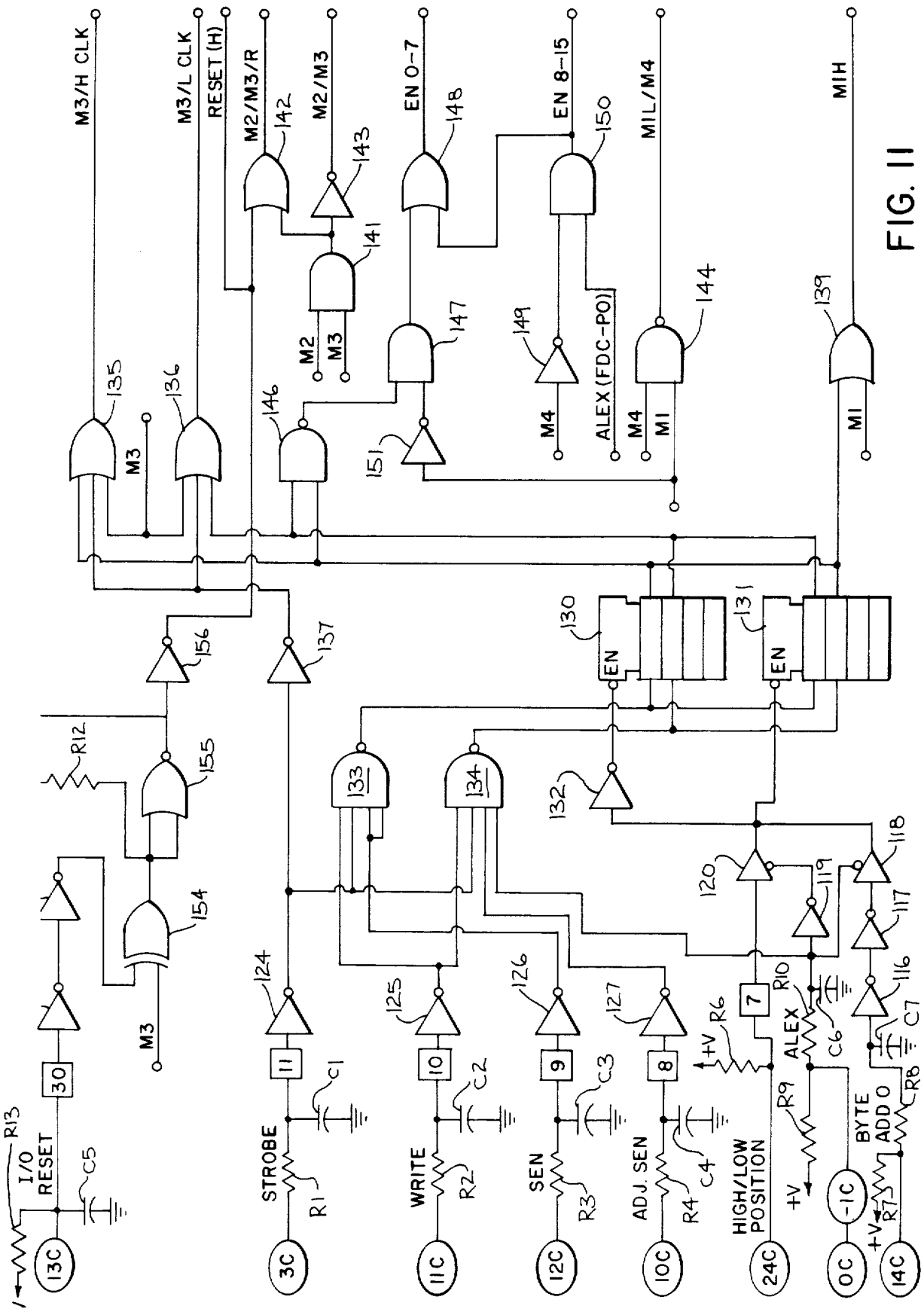
FIG. 11 is an electrical schematic diagram of the backplane control logic represented in FIGS. 9 and 10.

FIG. 11 shows how the backplane signals are logically combined with the mode select signals M1-M4 to produce the enable signals just discussed. Pins 3C, 11C (assuming an output module), 12C and 10C of the backplane connector (circled) are connected to pins 8-11 of the IC (boxed) to couple the STROBE signal, the WRITE signal, the slot enable (SEN) signal, and the adjacent slot enable (ADJ SEN) signal to the IC. The pins of the backplane connector are connected through series resistors R1-R4, shunt capacitors C1-C4 and inverters 124-127, which together provide inputs for TTL-level signals that are received through the backplane. The STROBE line is also connected through an external pull-up resistor (not shown), so that, in absence of a logic low signal at pin 3C, the STROBE line will remain at a logic high level.

The HIGH/LOW POSITION signal controls the order in which data bytes are sent or received and is itself received at "pin 24C," which is pulled high through a resistor R6. The HIGH/LOW POSITION line connects "pin 24C" to the enable (EN) inputs on a pair of 4-gate buffers 130 and 131 with non-inverted outputs. The HIGH/LOW POSITION line is connected to the first buffer 130 through an inverter 132 so that either one, but not both, of the buffers 130 and 131 are enabled. Thus, the logic state of the HIGH/LOW line will select one of the buffers 130 and 131 for operation.

Also seen in FIG. 11 are a pair of four-input NAND gates 133, 134 which couple—in a logical sense—the WRITE line and the STROBE line with the ADJ SEN line and SEN line, respectively. The first gate 133 operates to pass active STROBE and WRITE signals associated with the ADJ SEN line, while the second gate 134 operates to pass active STROBE and WRITE signals associated with the ADJ SEN line. This second gate 134 can be disabled through a line dubbed the ALEX line, which is connected to its fourth input.

The outputs of both gates 133 and 134 are connected to the first and second gates, respectively, in each buffer 130, 131. The first and second gates of the first buffer 130 are connected to two three-input OR gates 135 and 136. The first and second gates in the second buffer 131 are connected in reverse to the OR gates 135 and 136, so that the first gate of the buffer 130 and the second gate of the buffer 131 connect to an input on the first OR gate 135. Conversely, the second gate of the buffer 130 and the first gate of the buffer 131 connect to an input on the second OR gate 136. The other inputs to these OR gates 135 and 136 are provided by the STROBE line through a second inverter 137 and by the M3 mode select line, which is active when the IC is used in MODE 3 position seen in FIG. 4.

The above-described circuitry provides the IC with two latch enabling circuits to control LATCH A and LATCH B seen in FIGS. 9 and 10. The OR gates 135 and 136 provide the high byte clock (M3/HCLK) signal and the low byte clock (M3/LCLK) signal to determine which latch receives an incoming byte of data. The signals are generated sequentially so that first one byte, and then the other, is coupled from the I/O data bus 37 to the latching circuitry. Whichever buffer 130, 131 is enabled, the signal on the SEN line will generate one enable signal and the signal on the ADJ SEN line will generate another enable signal.

The buffers 130, 131 in FIG. 11 are also connected to an OR gate 139, which, during MODE 1 operation, controls the order in which bytes are coupled from the DEMUX data latches 106 in FIG. 9 to the backplane through output buffer 110. The first gate of the first buffer 130 and the second gate of the second buffer 131 are connected to one input on the the OR gate 139. The other input receives the M1 mode select signal and the output provides the M1H signal.

Depending upon which buffer 130, 131 is enabled, either the signal on the SEN line or the signal on the ADJ SEN line will generate the M1H signal.

To provide the additional enabling signals without altering the I/O scanning signals from the processor module 20, "pin 12C" in the left-hand slot of each pair of I/O modules in FIG. 1 has been cross-connected by a circuit path to "pin 10C" in the right-hand slot, and "pin 12C" in each right-hand slot has been cross-connected by a circuit path to "pin 10C" in the left-hand slot. These cross connections provide the ADJ SEN lines.

The I/O scanning operation is more fully explained in the copending application of Struger, entitled "Methods and Apparatus for Scanning a Higher Density of I/O Circuits," and filed concurrently herewith. During the I/O scan sequence for a pair of I/O modules, a signal on the SEN line will still result in the coupling of a byte of status data to or from each module, according to the input or output direction of transfer. When, however, the SEN signal is repeated for I/O transfer in the other direction, a byte of data can be coupled from a complementary module in the adjacent slot, by virtue of the SEN signal being received at "pin 10C" in the adjacent slot in the form of the ADJ SEN signal. The coupling of the SEN signal for I/O transfer in either the input or output direction would previously have been a "dummy" operation. But now, this signal is coupled to "pin 10C" in an adjacent slot in the form of the ADJ SEN 1 signal.

In the same amount of time and with the same enabling signals from the processor module 20, the amount of I/O status data transferred to and from each pair of I/O modules has doubled. This allows the use of sixteen-bit capacity I/O modules in the same slots occupied by eight-bit modules. In fact, an eight-bit module can be paired with a sixteen-bit module so long as one is an input module and the other is is an output module. The principle that any individual slot will accommodate either an input module or an output module is preserved. It is possible, however, for the two bytes of I/O status data to be coupled in reverse order unless the I/O transfer is controlled according to whether the I/O module is in a left or right slot. Therefore, "pin 24C" in each left slot is connected to ground, and "pin 24C" in every right slot is left unconnected. These connections provide either a high or low logic signal at "pin 24C" seen in FIG. 11.

Referring then to FIG. 11, if "pin 24C" is grounded when the I/O module is in a left slot, a logic low signal enables the lower set of buffers 131. In MODE 3, an SEN signal, a STROBE signal and a WRITE signal will generate the M3/LCLK signal through NAND gate 133, buffer 131 and OR gate 136. In MODE 3, the ADJ SEN signal will generate the M3/HCLK signal through NAND gate 133, the buffer 131 and the OR gate 135. In MODE 3, two bytes of data will be received through the backplane.

The buffers 130, 131 in FIG. 11 are also coupled through a NAND gate 146, an AND gate 147 and an OR gate 148 to the EN 0-7 enable line controlling the data byte output buffer 110 in MODE 1 and MODE 4. The M1 select line is connected to the AND gate 147 through inverter 151. In MODE 1, both the SEN and ADJ SEN signals will generate the EN 0-7 enable signal through NAND gate 146, AND gate 147 and OR gate 148. The state of the MIH signal from OR gate 139 is opposite for the SEN and ADJ SEN signals to control input of low and high input bytes, respectively. In MODE 1, two bytes of data are coupled from the output buffer 110 to the backplane. In MODE 4, the output buffer 110 is connected to output devices on the machine side of the I/O module 14 and only the low byte of data is transferred from the output buffer 110. Therefore, the EN 0-7 line is active in MODE 4, but the M1H line is not.

From the above description, it follows that the HIGH/LOW POSITION signal is needed only when the IC is operated in MODE 1 or MODE 3, because these are the two modes where two bytes of data are transferred over a data bus that is only one byte in width. "Pin 24C" is left in its pulled-up condition when the I/O module 14 is placed in a right-hand (high) slot. The logic high signal is inverted to enable the upper set of buffers 130 in FIG. 10. This switches the relationship of the SEN and ADJ SEN signals to the high and low byte enabling signals so that a low byte is transferred in response to the ADJ SEN signal and a high byte is transferred in response to the SEN signal.

An alternative to using the SEN and ADJ SEN signals to select which one of two bytes is transferred, is provided by the operation of the ALEX line and a BYTE ADDRESS 0 line. Signals in the BYTE ADDRESS 0 line select first one byte, and then the other. The SEN signal then becomes an enabling signal without being a byte select signal. The ALEX line controls which pair of control signals is used.

The BYTE ADDRESS 0 line is connected through "pin 14C" to pull-up resistor R7, and through series resistor R8, inverters 116, 117, a gate 118 and inverter 132 to the two enable inputs on buffers 130 and 131. A filtering capaciter C7 is connected to ground in front of the inverter 116. The ALEX line is connected through "pins OC and -1C" to pull-up resistor R9, and through series resistor R10, shunt capacitor C6 and inverter 119 to an enable input on a gate 120 in the HIGH/LOW POSITION line. When the ALEX line is active (low-true) it enables gate 118 and disables gates 120 and 134. This effectively decouples the ADJ SEN and HIGH/LOW POSITION lines from the enable inputs on the buffers 130, 131 and switches control of the buffers 130, 131 to the BYTE ADDRESS 0 line.

The ALEX and BYTE ADDRESS 0 signals are provided for operation with newer processors, whereas the ADJ SEN signal is provided for operation with earlier processors, making the I/O module 14 compatible with both. For further information on the operation of the circuitry just described, reference is made to the copending application of Struger, entitled "Methods and Apparatus for Scanning a Higher Density of I/O Circuits."

Also seen in FIG. 11 are the gates for controlling the second data output buffer 111 of FIG. 9 when the IC is operated in MODE 4. The second buffer 111 is controlled through the EN 8-15 line running from the output of AND gate 150. This gate 150 is controlled by the M4 mode select line which is coupled through an inverter 149, and is also controlled by the ALEX line, functioning not as the ALEX line, but as a line for selecting a pulse output (PO) mode of operation. The ALEX function is applicable only to MODES 1 and 3, so that line can be used to select the pulse output function in MODE 4. The output of AND gate 150 is cross-connected to one input of OR gate 148 so that output buffers 110, 111 can be enabled simultaneously in MODE 4.

The backplane logic control circuit of FIG. 11 also combines signals for controlling the circuits on the IC that handle transfer of data across the isolation interface. The MODE 2 and MODE 3 select lines are coupled through an AND gate 141 to one input on an OR gate 142 and to an inverter 143. The M2/M3/R signal is provided at the output of the OR gate 142 to enable and disable the 16-to-1 MUX circuit 108 in FIGS. 9 and 10. The M2/M3 signal is produced at the output of the inverter 143 to enable and disable the DATA output buffer 109. The M1 and M4 signals are combined through a NAND gate 144 to provide the M1/M4(H) signal that enables the ADDRESS and TEST output buffer 100.

The remaining circuitry in FIG. 11 concerns the reset functions of the IC. A RESET line is connected through IC pin 30 and two inverters 152, 153 to one input on an ex-OR gate 154. The second input on the ex-OR gate receives a signal on the M3 mode select line. The RESET line is connected to "pin 13C" on the backplane to receive a high-true RESET signal from the processor when the IC is in the position for MODE 3 operation seen in FIG. 4. A logic high signal appears at the ex-OR gate 154 along with a low-true M3 signal to generate a high output signal from the ex-OR gate 154. The output of the ex-OR gate is pulled high through resistor R12 and is also connected to both inputs of a NOR gate 155. A logic high at the output of ex-OR gate 154 produces a logic low at the output of the NOR gate 155, which is inverted by inverter 156 to become the RESET (H) signal, which is the reset signal in MODE 3.

The RESET "pin 30" is also pulled up through resistor R13 and connected to ground through capacitor C5. This provides a reset signal in MODE 1, MODE 2 and MODE 4. When the power supply is "turned on" in these modes, the RESET pin 30 is at a logic low until capacitor C5 is charged. This logic low is coupled through inverters 152 and 153 to the ex-OR gate 154, which is now receiving a logic high signal on the M3 line. This again produces a high output signal at the output of the ex-OR gate 154 and a low output signal from the NOR gate 155, which becomes the logic low reset signal for MODES 1, 2 and 4. When capacitor C5 is charged, the output of the ex-OR gate 154 goes low and the RESET signal is terminated. This completes the description of the circuitry in FIG. 11.

Referring back to FIGS. 3 and 4, the integrity of the optical coupling circuits 33–36 and 42–45 must be checked when data is transmitted across the isolation interface. Error checking is initiated by the opto address generator circuit 99 seen in FIG. 9, which transmits error bit addresses across the isolation interface to an error bit generator circuit 107 in a second IC. The error bit generator circuit 107 returns error bits across the isolation interface to an error detection circuit 105 on the same IC as the opto address generator 99. Referring to Table 2 above, it should be noted that the opto address generator 99 and the error detection circuit 105 are active in MODE 1 and MODE 4. The error bit generating circuit 107 is active in the complementary modes, MODE 2 and MODE 3, respectively.

Figure 13:
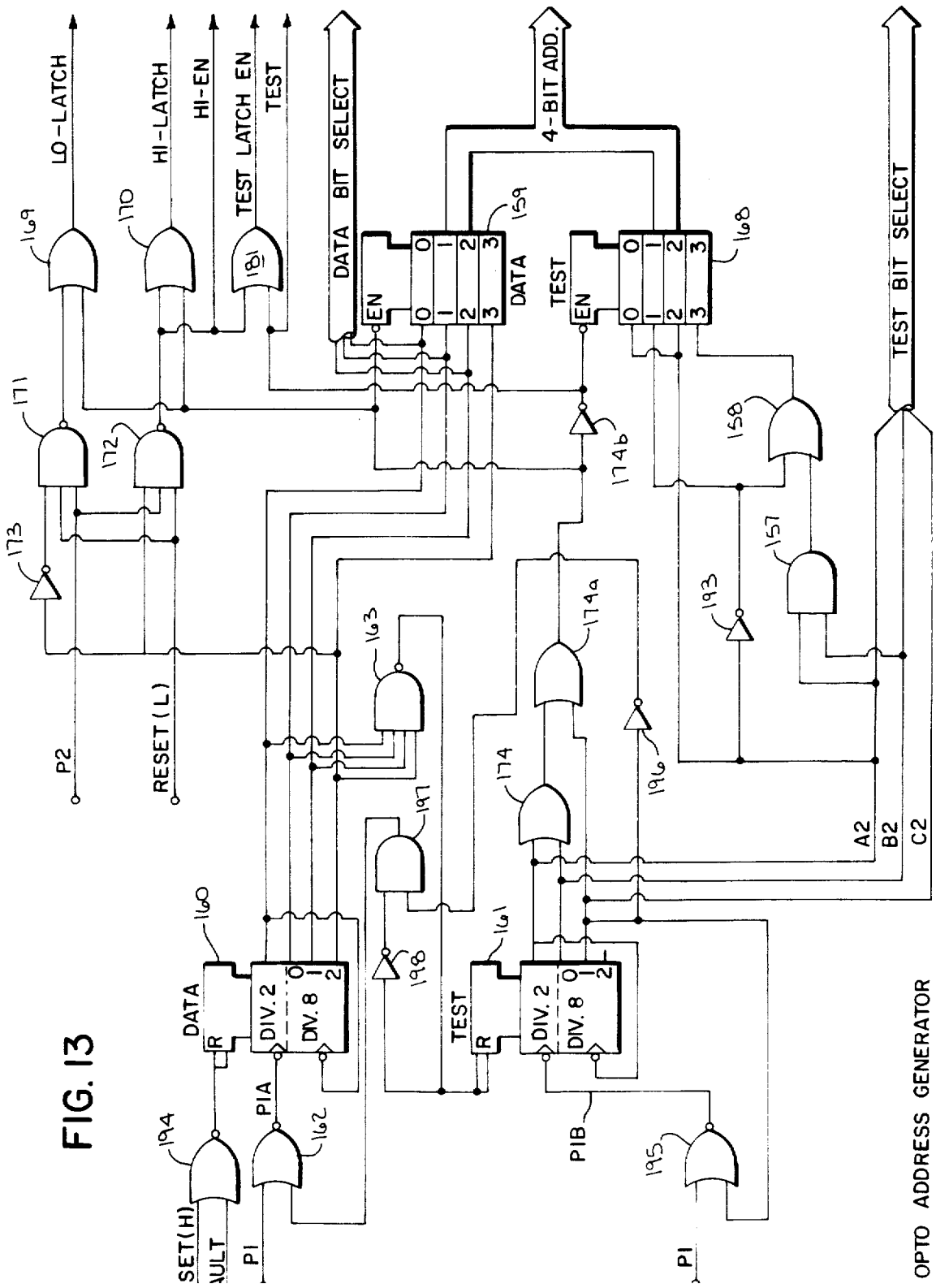
FIG. 13 is an electrical schematic diagram of an "opto" address generator represented in FIGS. 9 and 10.

Referring now to FIG. 13, the opto address generator circuit 99 has a DATA address counter 160 to generate data addresses for the sixteen bits of data that are transferred across the isolation interface. It also has a TEST address counter 161 to generate three TEST addresses to cause three additional bits, referred to as error bits, to be transferred across the isolation interface after the data bits. In each data and TEST sequence the data addresses are generated first. The P1A clock signal drives the data address counter 161 through a NOR gate 162. The NOR gate 162 is present to decouple the P1A clock signal during the second portion of the data transfer cycle in which the TEST addresses are generated. While the DATA address counter 160 is counting from 0000 (binary) to 1111 (binary), one or more logic low signals will be coupled to a four-input NAND gate 163 to produce a logic high signal that holds the TEST address counter 161 reset. With all zeroes at the output of the TEST address counter 161, a logic low signal is coupled to an enable (EN) input on a first buffer 159. Through this buffer 159 data addresses are coupled to the address output buffer 100 seen in FIG. 9 and to lines A0–A3 and the optical coupling circuits seen in FIGS. 3 and 4. The inputs to the first buffer 159 are also connected to three DATA BIT SELECT lines going to the addressable data latches 103, 104 seen in FIG. 9 and in FIG. 15. When the opto address generator 99 sends for a particular data bit on the other side of the isolation interface, it also identifies the bit to the data latches 103, 104.

Assuming that an address is sent across the isolation interface, it is received by both the error bit generating/data selection circuit 107 and the sixteen-to-one MUX circuit 108 seen in FIG. 9. When the sixteen-to-one MUX circuit 108 receives a data address, it transmits a bit of serial data to the error circuit 107, which is seen in detail in FIG. 14. This bit of data is coupled to one input of a two-input OR gate 164. The OR gate 164 functions as a low-true AND gate, so that when both input signals are low, the output signal will be low. When data addresses are generated, the TEST (H) signal is at a logic high, and consequently the TEST (H) signal is at a logic low level to enable the OR gate 164. The TEST signal is also coupled through an inverter 165 to a second such OR gate 166, and the outputs of the two OR gates 164, 166 are coupled through a NAND gate 167 to the DATA line going through the DATA output buffer 109. When the second OR gate 166 is disabled, it generates a logic high to the NAND gate 167. For each low true signal coming from the sixteen-to-one MUX circuit 108 a high-true data signal will be produced at the output of the NAND gate 167. The high-true signal is inverted to low-true as it is coupled through the DATA output buffer 109 seen in FIG. 9.

Each bit of data is returned to the IC from which the data address is originated. These data bits are coupled through the DATA (serial data) input buffer 102 in FIG. 9 to the addressable data latches 103, 104. These latches 103, 104 have received the bit identification on the DATA BIT SELECT lines.

Figure 15:
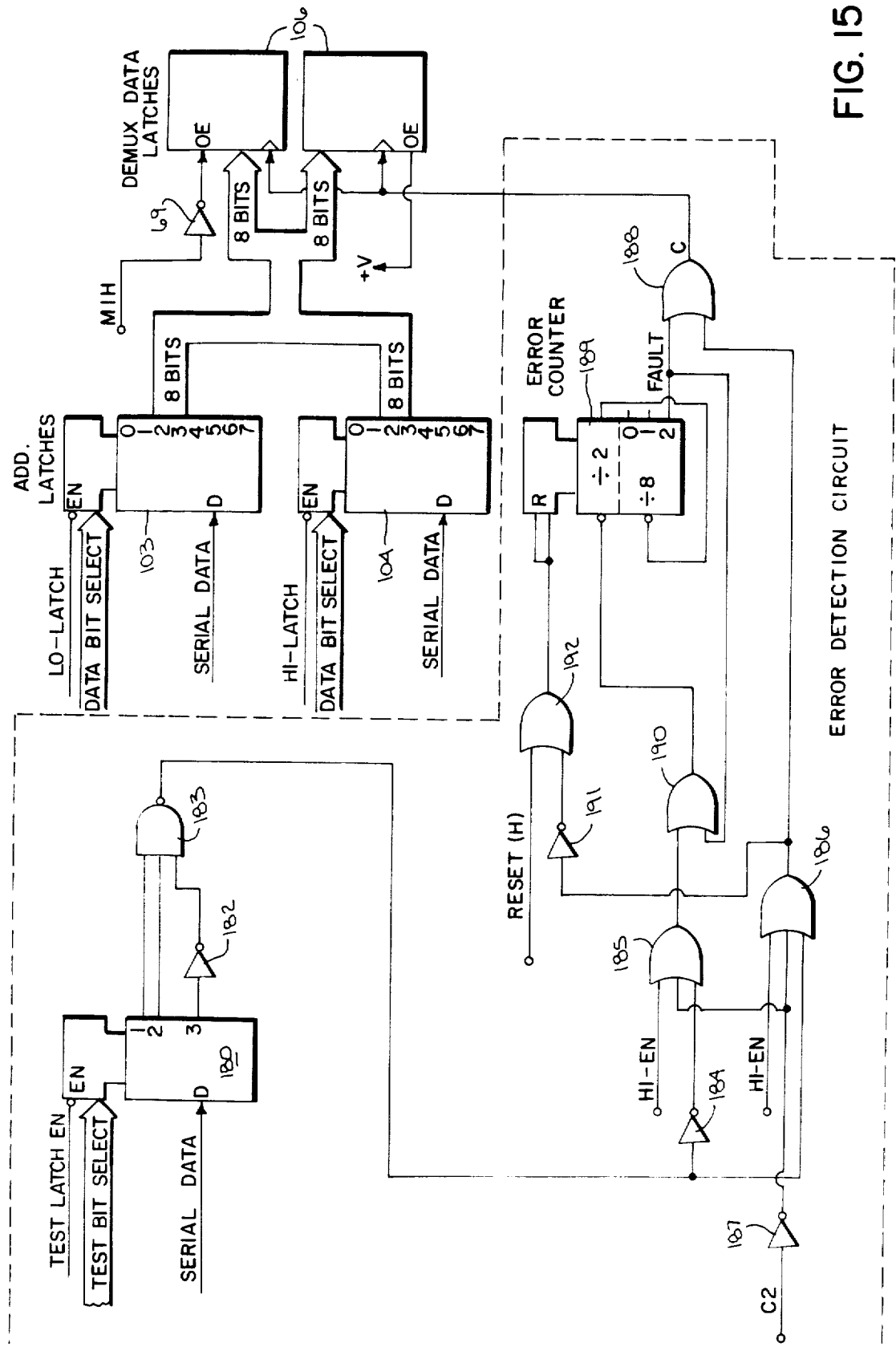
FIG. 15 is an electrical schematic diagram of an error detection circuit represented in FIGS. 9 and 10.

As seen best in FIG. 15, each data bit will be received at either a serial data input (D) on the low byte latch 103 or at a serial data input (D) on the high byte latch 104 according to which latch is enabled. The LO-LATCH and HI-LATCH enabling signals are developed by the opto address generator circuit 99 seen in FIG. 13. There, the enable signal to the two buffers 159, 168 also controls a pair of OR gates 169, 170, one gate 169 having an output connected to a LO-LATCH enable line going to the low byte latch 103. The other OR gate 170 has an output connected to a HI-LATCH enable line to the high byte latch 104. The other inputs to each of these OR gates 169, 170 comes from two respective three-input NAND gates 171, 172. The high order output of the address generating counter 160 is coupled through an inverter 173 to the NAND gate 171 associated with the LO-LATCH line. The high order output is also coupled directly to the NAND gate 172 associated with the HI-LATCH line. When the DATA address counter 160 begins counting from 0000 (binary) to 0111 (binary), the high order output is at a logic low level (0) and the upper NAND gate 171 is enabled. When the counter advances to 1000 (binary), the lower NAND gate 172 is enabled and the upper NAND gate 171 is disabled. The LO-LATCH line and the HI-LATCH lines are also controlled by the RESET (L) signal and by the P2 clock signal that latches the data.

The high byte and low byte latches 103, 104 in FIG. 15 receive sixteen bits of data, and the DATA BIT SELECT signals are sequenced so that serial data is directed to the sixteen parallel outputs on these latches. The data is not considered valid, however, until it is transferred to the DEMUX data latches 106 seen in FIG. 15. For this data transfer, the DEMUX data latches 106 must be enabled, and a clock (C) signal must be coupled to the DEMUX latches 106. The clock signal is not generated until the error bit transfer sequence has been successfully executed.

Returning to FIG. 13, the opto address generator completes the DATA address sequence and enters the TEST address sequence when the data counter 160 reaches 1111 (binary) and the reset signal is removed from the TEST address counter 161. The next P1B clock pulse begins the three-bit TEST address count at 001 (binary). The logic high signal or "1" will appear on line A2 going to one input of an OR gate 174. The OR gate 174 and a succeeding OR gate 174a will pass a logic high signal, which will be inverted by an inverter 174b to enable the second buffer 168 which couples a TEST address. At the same time the DATA address buffer 159 will be disabled by the non-inverted signal from the second OR gate 174a. The A2 line is also coupled to the low order input and the third input on the TEST address buffer 168 to generate a binary address of "0101", which is the equivalent of "05" in the hexadecimal numbering system. The address at the TEST address buffer 168 is coupled across the isolation interface as the seventeenth address and the first TEST address. The enabling signal to the TEST address buffer 168 is also transmitted on the TEST line through the inverter 101 seen in FIG. 9 to the TEST output buffer and to the TEST optical coupling circuits 35, 44 seen in FIGS. 3 and 4. It can be seen in FIG. 9, that when a TEST address with bits A0–A3 and a TEST signal is received on the other side of the isolation interface it is coupled through the address input buffer 100a to the error bit generator circuit 107.

Figure 14:
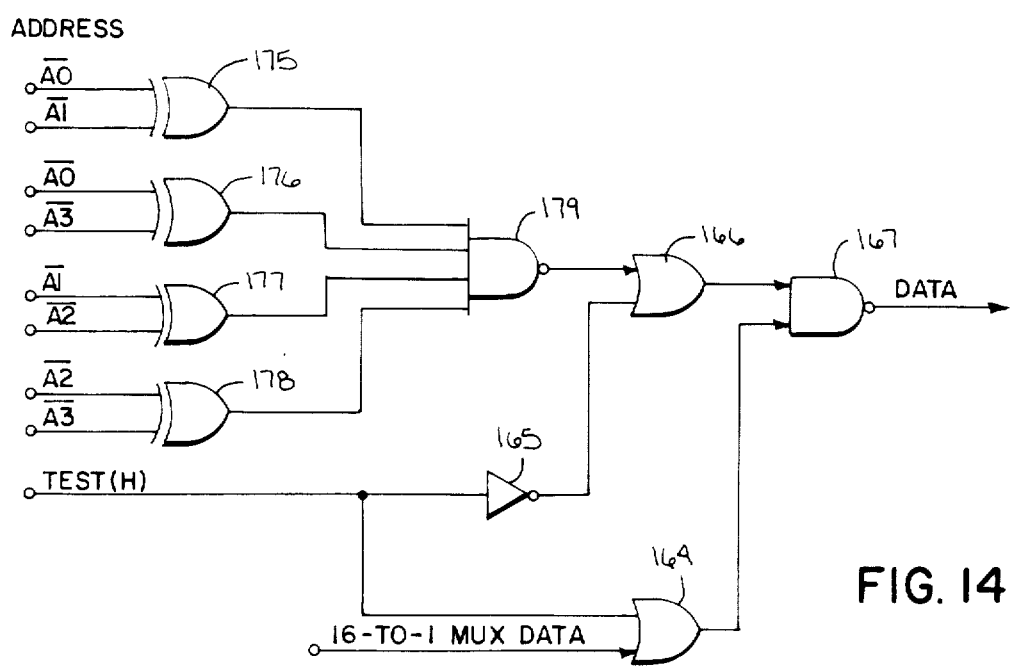
FIG. 14 is an electric schematic diagram of an error bit generator circuit represented in FIGS. 9 and 10.

FIG. 14 shows the address signals A0–A3 being received after they have been inverted by the address input buffer 100a. The inverted signals are coupled in pairs through four exclusive-OR gates 175–178 to a four-input NAND gate 179. If the A0 and A2 bits are low and the A1 and A3 bits are high (for the TEST address 05 in hexadecimal notation) all four exclusive-OR gates 175–178 produce a logic high output signal and the output of the four-input NAND gate 179 is at a logic low level. At the same time the OR gate 166 is enabled in response to a high-true TEST signal being received with the TEST address and the OR gate 164 receiving data from the sixteen-to-one MUX circuit 108 is disabled. Thus, an error bit is coupled through the NAND gate 167 as a logic high signal, which is inverted to a logic low or "0" signal by DATA buffer 109 before being coupled through the isolation interface.

Returning to the TEST address counter 161 in FIG. 13, the circuit now counts up to 02 (hexadecimal) which produces a logic low signal on the A2 line and a logic high signal on the B2 line. Besides being coupled to the "0" and "2" inputs on the TEST address buffer, the A2 line is also coupled through an inverter 193 to the "1" input. The B2 line on the other hand is coupled with the A2 line through an AND gate 180 and an OR gate 181 to the "3" input. This logic results in an address of 0A (hexadecimal) at the input of the TEST address buffer 168 when the address 02 is generated by the TEST address counter 161. Referring then to FIG. 14, when address 0A (hexadecimal), which is the equivalent of 1010 (binary) is generated, it causes the A1 and A3 signals to be low and the A0 and A2 signals to be high. These signals are coupled to the ex-OR gates 175–178 in FIG. 14, to generate another "1" error bit at the output of the NAND gate 167. This is inverted to a "0" bit by DATA buffer 109. The first two TEST addresses test the four address optical coupling circuits by confirming that bits have been sent through them.

Returning again to FIG. 13, the TEST address counter then counts up to 03 (hexadecimal) which generates an address 0D (hexadecimal) at the inputs to the TEST address buffer 168. When this address is coupled through the isolation interface to the error bit generator circuit in FIG. 15, it generates a "0" data bit at the two-input NAND gate 167, which is inverted to a "1" data bit by DATA buffer 109. This bit assures that the DATA optical coupling circuit has not failed. The table below summarizes the generation of the three TEST address signals and the error bit signals transmitted through the optical coupling circuit in response thereto.

TABLE 3

| ERROR BIT GENERATION | |
|---|---|
| TEST Address (Hex = Binary) | Error Bit Transmitted |
| 05 = 0101 | 0 |

TABLE 3-continued

| ERROR BIT GENERATION | |
|---|---|
| TEST Address (Hex = Binary) | Error Bit Transmitted |
| 0A = 1010 | 0 |
| 0D = 1101 | 1 |

As the TEST addresses 05, 0A and 0D (hexadecimal) are being sent to the error bit generator circuit 107, the TEST BIT SELECT addresses 01, 10 and 11 (binary) are coupled on the TEST bit select lines A2 and B2 which direct the error bits to outputs "1", "2" and "3" of the TEST bit latch 180 seen in FIG. 15. This latch 180 is enabled through the TEST LATCH EN line which originates at the output of an OR gate 181 in FIG. 13. If the TEST address buffer 168 is enabled, a signal is coupled through this OR gate 181 to enable the TEST bit latch 180 in FIG. 15.

When the correct error code "110" is present at the outputs of the TEST bit latch 180 in FIG. 15, it will generate a logic low at the output of a NAND gate 183, which receives the "3" output signal through an inverter 182. The output of the NAND gate 183 is connected through an inverter 184 to one OR gate 185 and is connected directly to an input on another OR gate 186. The C2 TEST BIT SELECT line is coupled through an inverter 187 to the inputs on both OR gates 185, 186. The OR gates 185, 186 also receive the HI-EN signal at a third input. If the correct error code is sensed when the HI-EN signal and the C2 signal are present, a signal from the output of the second OR gate 186 will be coupled to another OR gate 188 controlling the clock (C) signal to the DEMUX data latches 106. The clock signal will be generated unless a fault counter 189 has counted up to eight errors to generate a logic high FAULT signal to the other input of this OR gate 188.

If an incorrect error code is present when the HI-EN signal and the C2 signal appear, an error signal will be generated from the output of the first OR gate 185. This error signal is coupled through another OR gate 190 to the error counter, providing that a FAULT signal is not already present. The output of the divide-by-two section of the counter 189 is coupled to the input of the divide-by-eight section to place the counter 189 in an eight-count mode of operation. The counter 189 is reset by a logic high RESET signal coupled through an OR gate 192 to a reset input on the error counter 189. The error counter 189 is also reset through an inverter 191 and the OR gate 192 each time a clock (C) signal is generated to acknowledge successful completion of the error test. Using the above fault counting circuit, an IC operating in MODE 1 or MODE 4 will attempt to validate the data transfer eight times before a fault is declared. When a fault is declared, the data can be cleared from the latches 103, 104 by a signal through a reset line (not shown) or the data can be held as a "last state" condition.

Returning to FIG. 13, when a FAULT signal is generated, it is coupled through an OR gate 194 to hold the DATA address counter reset. If the TEST sequence is completed, the last address signal of the TEST sequence, which is carried on the C2 line, will be coupled through a NOR gate 195 to decouple P1A clock signals from the TEST address counter 161. Also, the C2 signal will be coupled through an inverter 196 and AND gate 197 to re-enable the NOR gate 162 to restart the DATA address sequence. The signal from the inverter 196 to the AND gate 197 goes low while the signal to the other input through the inverter 198 is high. This completes the full DATA and TEST address sequence.

Besides the circuitry discussed so far, the integrated circuit (IC) includes specialized circuitry for interfacing the input and output circuits seen in FIGS. 3 and 4. When interfacing input circuits in MODE 2, the timing circuitry in FIG. 10 generates up clock (UP CLK) and down clock (DN CLK) signals to control the input delay circuits also seen in FIG. 10. These are sixteen input delay circuits 113, one for each input.

Figure 16:
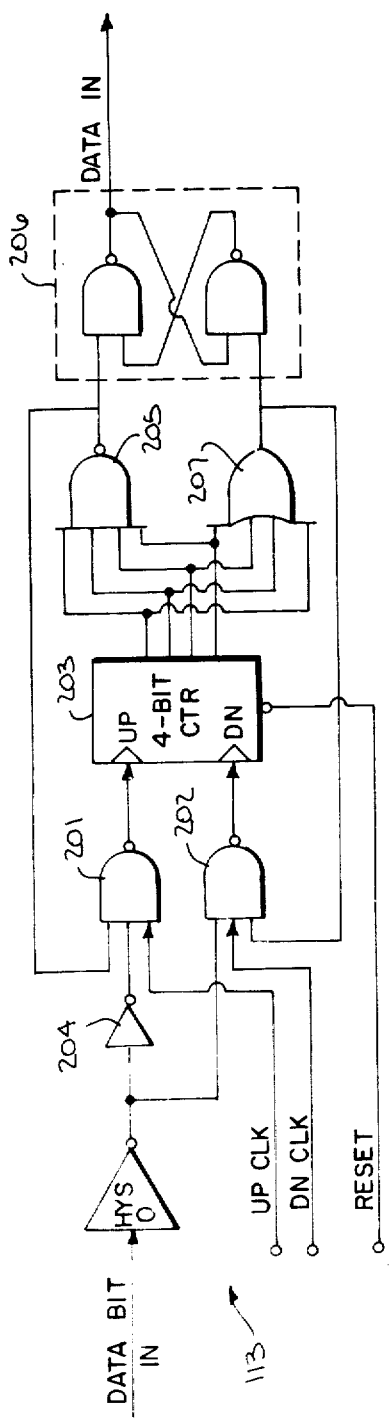
FIG. 16 is an electrical schematic diagram of one of the input delay circuits represented in FIGS. 9 and 10.

FIG. 16 shows one of the sixteen identical input delay circuits 113. An input signal DATA BIT 0 IN is coupled through a hysteresis inverting circuit HYS 0. For DC input signals this circuit acts as an inverter with a single threshold for discriminating between high and low logic levels. For AC inputs this circuit establishes threshold levels for logic high and logic low voltage signals. The details of this circuit will be explained below in relation to FIG. 17, but for now it is sufficient to know that the output of this circuit gates the UP CLK and DN CLK signals through two NAND gates 201, 202 to a four-bit up/down counter 203 to provide an ON delay and an OFF delay. The signal from the HYS 0 circuit to gate 201 is inverted by inverter 204.

If the input signal on the DATA BIT 0 IN line goes high or ON (after previously being low or OFF), the UP CLK signal is gated through the NAND gate 201 to the UP input on the counter 203. The counter 203 will count up from 0000 (binary) to 1111 (binary). The outputs of the counter 203 are also connected to a four-input NAND gate 205, and its output goes low to set the NAND S-R flip-flop 206 and generate a logic high signal on the DATA IN line. The output of the four-input NAND gate 205 is coupled back to an input on the clock signal NAND gate 201 to decouple the UP CLK signal, so that the counter 203 will not turn over from 1111 to 0000.

When the DATA BIT 0 IN input goes low or OFF (after previously being high or ON), the DN CLK signal is gated to the down (DN) clock input on the counter 203. The counter 203 will count down from 1111 (binary) to 0000 (binary). When that occurs, the outputs which are coupled to a four-input OR gate 207 are all low. This causes the output of the OR gate 207 to switch to a logic low level, which resets the NAND S-R flip-flop 206, so that the DATA IN line is switched low. The output signal from the OR gate 207 is fed to the NAND gate 202 to decouple the DN CLK signal and prevent the counter 203 from counting past zero.

Thus, the circuit in FIG. 16 does not signal that an input is ON until the DATA BIT 0 IN signal has been present for sixteen UP CLK pulses after a reset. The circuit also delays the response to an OFF signal for sixteen DN CLK pulses. The response to ON and OFF signals can be speeded up by increasing the frequency of the UP CLK and DN CLK signals for a "fast DC" (FDC) mode of operation.

Figure 17:
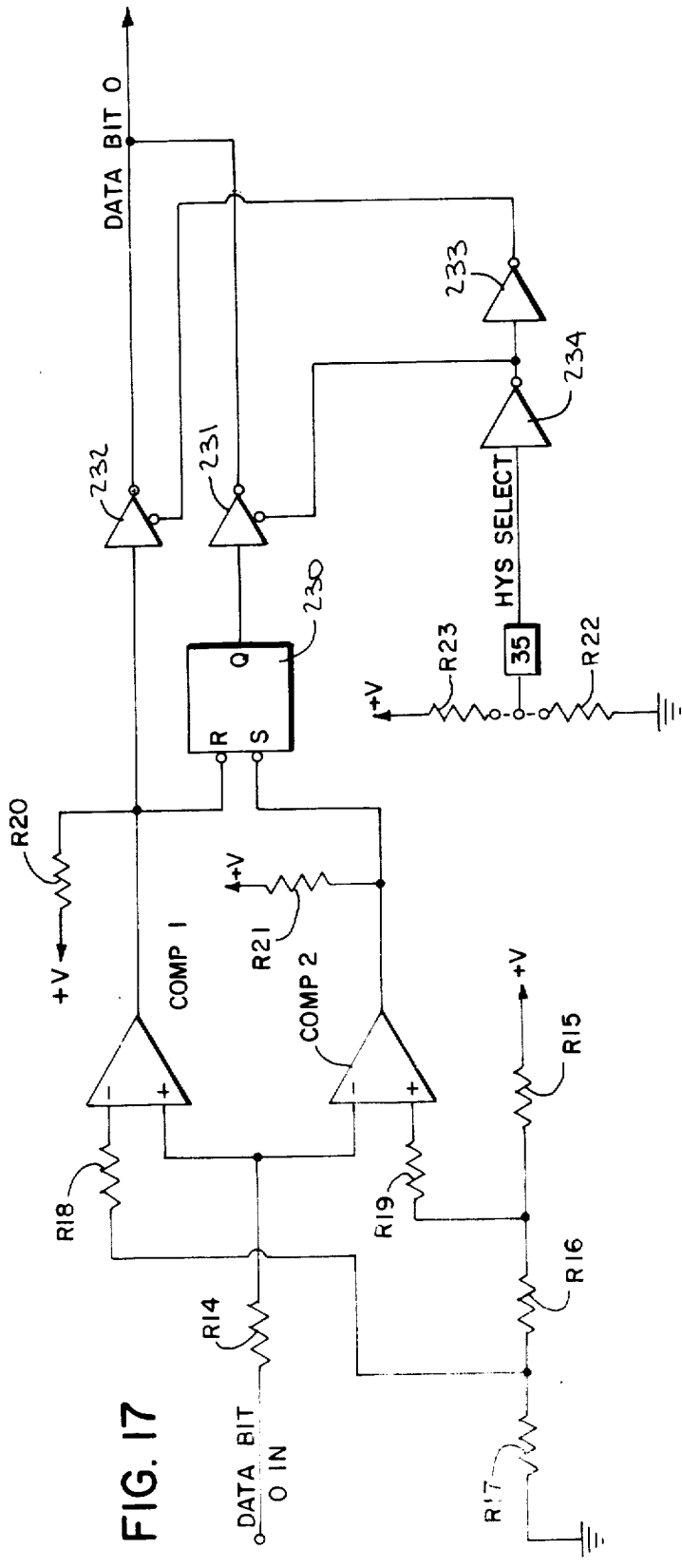
FIG. 17 is an electrical schematic diagram of a hysteresis circuit labeled HYS O in FIG. 16.

The HYS 0 circuit in FIG. 16 is shown in more detail in FIG. 17. The DATA BIT 0 IN line is connected through resistor R14 to the noninverting (+) input of the comparator COMP 1 and to the inverting (−) input of the comparator COMP 2, with these two inputs being connected together. A biasing circuit is provided by resistors R15, R16 and R17, which are connected between the +5-volt DC supply voltage (+V) and ground. The inverting (−) input of the comparator COMP 1 is connected through resistor R18 to the junction between resistors R16 and R17 to receive a reference voltage signal of +1.4 DC volts. The noninverting input of the comparator COMP 2 is connected through resistor R19 to the junction between resistors R15 and R16 to receive a second reference voltage signal of +3.6 DC volts.

These two reference levels define a logic high (above +3.6 DC volts) and a logic low (below +1.4 volts) for AC inputs. A signal between these two reference levels of +1.4 DC volts and +3.6 DC volts is ambiguous and therefore it is not effective in changing the output of the circuit in FIG. 17. When DC inputs are present, only the COMP 1 comparator is effective in responding to signals on the DATA BIT 0 in line. This provides a single reference system for DC input signals, with signals above +1.4 DC volts being seen as logic high signals and signals below +1.4 DC volts being seen as logic low signals.

The outputs of the comparators COMP 1 and COMP 2 are connected to the reset (R) and set (S) inputs, respectively, of an R-S flip-flop 230. The outputs of the comparators COMP 1 and COMP 2 are also connected to the DC supply through resistors R20 and R21, so that in absence of a logic low at their outputs, their outputs will be pulled high. A logic low from the output of the comparator COMP 1 causes a logic low at the Q output of the flip-flop 230, while a logic low from the output of the comparator COMP 2 causes a logic high of the Q output of the flip-flop 230. The signal from the Q output of the flip-flop 230 is inverted by inverter 231, which is enabled when the circuit is functioning in the hysteresis mode for AC inputs. In this mode IC pin 35 (in the box) is connnected to the DC voltage supply through resistor R23. This signal is inverted by inverter 234 to enable inverting gate 231.

When the circuit is operated in the single reference mode for DC inputs, the output of the comparator COMP 1 is coupled through the inverter 232, which is enabled by a logic low signal from "pin 35" that is coupled through inverters 233 and 234. The logic low at pin 35 is generated by connecting it through resistor R22 to ground. At the same time this logic high disables inverter 231 which effectively decouples the output of the flip-flop 230 and the second comparator COMP 2 from the input of the inverter 204 in FIG. 16.

The portion of the timing circuitry 94 in FIG. 10 that generates the UP CLK and DN CLK signals in FIG. 16 is shown in FIG. 18. The primary components in this circuitry are two binary, divide-by-sixteen counters 208, 209. The first counter 208 receives the 100-kHz signal from the frequency select circuit 96 in FIG. 9. It receives this signal at its divide-by-eight clock input and divides this frequency by four to generate a 25-kHz signal from its Q4 output. It also divides this frequency by eight to generate a 12.5-kHz signal from its Q8 output to the divide-by-two clock input on the second counter 209. The Q1 output on the second counter 209 is fed back to the divide-by-eight input on the second counter 209 so that the 12.5-kHz signal will be divided by four to generate a 3.125-kHz signal from the Q4 output.

The 25-kHz signal and the 3.125-kHz signal are the two clock frequencies used for the UP CLK signal. The 25-kHz signal is coupled with a fast DC/pulse output (FDC-PO) mode select line to the inputs of a NOR gate 210. The output of this NOR gate 210 is coupled with the 3.125-kHz signal to an OR gate 211 controlling the UP CLK line.

The 25-kHz signal and the 781.25-Hz signal are the two signals used for the DN CLK signal. The 25-kHz signal is coupled with the FDC-PO line to the inputs of another NOR gate 212 in FIG. 17. The output of this NOR gate 212 is coupled with the 781.25-Hz signal to an OR gate 213 controlling the DN CLK line.

The outputs of the OR gates 211 and 213 are connected through pulse width adjustment circuits 236, 237 to the UP CLK and DN CLK lines. These circuits 236, 237 reduce the pulse width of a 50% duty cycle waveform to one with approximately an 8% duty cycle. The pulse width is narrowed, without reducing the frequency of the pulses, so that spurious signals of short duration will not advance the counter 203 in FIG. 16. Such spurious signals might otherwise be interpreted as a signal that an input device was "on" when in fact it was "off".

One of these two identical circuits 236 is seen in FIG. 19. The inverters 238-241 are connected to one input of an open-collector ex-OR gate 242 to delay the signal that is seen at the other input to the ex-OR gate 242. The receipt of these two signals a short time apart generates a narrow output pulse from the ex-OR gate 242 to the AND gate 243 at twice the frequency of the pulses received from the OR gate 211. The AND gate 243 eliminates every other pulse so that the UP CLK signal is transmitted at the same frequency as the signal from the OR gate 211—only with a difference in its pulse width.

With an UP CLK signal or DN CLK signal of 25 kHz the DATA IN line in FIG. 16 will hold a signal for 0.64 milliseconds before switching. With the lower UP CLK frequency of 3.125 kHz, the ON delay is extended to 5 milliseconds and with the lower DN CLK frequency of 781.25 Hz the OFF delay is extended to 20 milliseconds.

The "fast DC" mode is selected when a logic low signal is present on the FDC-PO line. This enables the NOR gate 210 coupling the 25-kHz signal to the UP CLK line and it enables the NOR gate 212 coupling the 25-kHz signal to the DN CLK line. The FDC-PO line is also connected by an inverter 214 to the second counter 209 and it disables this counter 209 by holding both reset terminals high.

The timing circuitry 94 in FIGS. 9 and 10, through lines CP1-CP8, controls the coupling of data through the data output buffers 110, 111, when the IC is operated in MODE 1 or in MODE 4. During MODE 1 operation, two bytes of data are coupled through one output buffer 110. During MODE 4 operation, a byte of output data is coupled through each output buffer 110, 111, but this coupling is done by sequencing eight pairs of data signals through respective gates in the output buffers 110, 111.

Referring now to FIG. 20, lines CP1-CP8 are controlled by two sets of OR gates 215, 216. Lines CP1-CP4 can be enabled simultaneously when the EN 0-7 line is active or enabled sequentially in response to signals on lines P1-P4. Lines CP5-CP8 can be enabled simultaneously when the EN 8-15 line is inactive or enabled sequentially in response to signals on lines P5-P8. Signals on the EN 0-7 and EN 8-15 lines are used to control data transfer to the backplane through the output buffer 110 when the IC is operated in MODE 1. Signals on lines P1-P8 are used to control data transfer to DATA BIT OUT lines when the IC is operated in MODE 4.

As further seen in FIG. 20, this circuitry includes a divide-by-eight counter 217 with eight outputs. On each count a different one of the outputs P0-P8 is enabled. The counter 217 is clocked by the 400-kHz signal so that it counts one count every 2.5 microseconds. A cycle of twenty microseconds is necessary to activate each of the enable lines CP1-CP8 in sequence. As each line CP1-CP8 is activated a pair of data signals is coupled through a pair of gates in one of the output buffers 110, 111. Thus the output buffers 110, 111 can be operated in pulsed fashion for AC outputs in MODE 4 through the P1-P8 lines and output buffer 110 can be operated in the normal fashion in MODE 1 to couple bytes of data to the backplane. The pulse output counter 217 is activated by the M4 line and the FDC-PO lines which are coupled through an OR gate 218 with the reset line to a reset terminal on the counter 217. If any of the three lines is high, the counter 217 will be held reset and will not be effective in controlling the OR gates 215, 216. In MODE 4 the FDC-PO signal is held high for DC outputs so that data is coupled through the output buffers 110, 111 in bytes rather than in the sequential, pulsed mode used for AC outputs.

The universal IC has been described in terms of low scale integrated circuits such as latches, buffers, multiplexers and courters that are offered in standard commercial packages. Such circuits can be described at a lower level—for example, a counter can be further defined as a group of flip-flops connected to provide the counting function, and the flip-flops can be further defined in terms of gates that make up each flip-flop.

The manufacture of the universal IC's is accomplished by providing a manufacturer of custom integrated circuits with a circuit design in terms of such low scale integrated circuits, together with a specification of the input signals and output signals coupled to and from such circuits. The circuit design for the IC is preferably tested by constructing a breadboard prototype using primarily CMOS-technology IC packages of logic gates, latches, buffers, multiplexers and counters, which are standard catalog items. TTL-technology components are used for providing 15-milliamp output signals from the IC to the optical coupling circuits and to output devices. Inputs to the IC from the backplane are capable of sinking 30-milliamp TTL-level signals. A list of suitable components for the prototype is provided in Appendix A along with other components on the I/O modules, such as the optical coupling circuits.

After the custom IC manufacturer has received the universal IC specification, and a prototype of the circuit, if available, it develops an equivalent circuit in terms of individual gates and its own particular manufacturing technology. The custom IC manufacturer use the equivalent circuit of individual gates as input information to a computer-aided design system, which generates output information to produce the appropriate masks for actual fabrication of the IC according to its own photolithographic techniques. Design and fabrication methods may vary from vendor to vendor, while still providing a suitable IC as described herein. For example, certain vendors may produce a full custom chip where all levels of silicon fabrication are designed in response to the customer's specification. On the other hand, certain vendors may use a gate array technique where the customer's circuit is translated into standard cells available in the vendor's cell library. This defines the lower levels of semiconductor material. Then a pattern of interconnection is designed using one or more layers of metal to provide the circuit of the customer's specification. There are also design and fabrication methods that fall in between the "full custom" and "gate array" approaches, and these are referred to as "semi-custom" methods. The universal IC's described herein are currently being manufactured by Synertek Systems, Inc., Santa Clara, Calif., but other vendors are known to those skilled in the art for this type of manufacture.

From the above description it should be apparent to those skilled in the art that various modifications and alterations might be made in the detailed construction of the IC's while still providing I/O modules and IC's according to the invention. To apprise the public of that which is essential to the invention from that which is not, the claims following Appendix A are made.

Appendix A

| Component | Ref. Nr. | Description* |
|---|---|---|
| Optical coupling circuits A0–A1, A2–A3 | 33, 34, 42, 43 | Four HCPL 2533 dual logic interface opto-couplers manufactured by Hewlett-Packard |
| Optical coupling circuits | 35, 36 44, 45 | Two HCPL 2503 single logic interface opto-couplers manufactured by Hewlett-Packard |
| Latches | 38 | Two 74HC259 addressable latches manufactured by Hewlett-Packard |
| NAND gates | 90–93 144, 146, 167 | CD4011B quad 2-input NAND gates |
| Inverters | 69, 86–89, 101, 117, 119, 124–127, 132, 137, 143, 145, 149, 151, 153, 156, 165, 173, 176, 182, 184, 187, 191, 193, 196, 198, 204, 214, 219, 233, 234, 238, 241 | CD4049B hex inverting buffer gates |
| ADDRESS output buffer | 100 | Two 74LS38 quad two-input NAND buffers with open-collector outputs manufactured by Texas Instrument, Inc. |
| DATA output buffer | 109 | |
| ADDRESS input buffer | 100a | CD4049B hex inverting buffer gates |
| DATA input buffer | 102 | |
| Addressable data latches | 103, 104, 180 | Three CD4099B 8-bit addressable latches |
| DEMUX data latches | 106 | Four 74C173 4-bit D-type registers |
| 16-to-1 MUX circuit | 108 | 74C150 1-of-16 data selector/multiplexers |
| Data output buffers | 110, 111 | Four 74LS38 quad two-input NAND buffers manufactured by Texas Instruments, Inc. |
| Intermediate buffer | 112 | 74C244 octal buffers/line receivers with noninverted outputs |
| Data input buffer | 114 | 74C244 octal buffers/line drivers/line receivers with non-inverted outputs |
| Backplane buffer | 115 | CD4049B hex inverting buffer gates |
| Latches | A & B | Four 74C173 4-bit D-type registers |
| Buffers | 130, 131 159, 168 | Two 74C244 octal buffers/line drivers/line receivers with non-inverted outputs |
| NAND gates | 133, 134, 163, 205 | Two CD4012B dual four-input NAND gates |
| OR gates | 135, 136, 185, 186, 218 | CD4075B triple three-input OR gates |
| OR gates | 139, 142, 148, 158, 164, 166, 169, 170, 174, 174a, 181, 188, 190, 192, 211, 213, 215, 216 | CD4071B quad 2-input OR gates |
| AND gates | 141, 147, 150, 153, 157, 220, 243 | CD4081B quad 2-input AND gates |
| Inverter | 116, 152, 239 | 74C914 inverting buffer gates |
| NAND gates | 171, 172, 183 201, 202 | CD4023B triple 3-input NAND gates |
| OR gate | 207 | CD4072B dual four-input OR gates |
| 4-bit counter | 203 | 74C193 synchronized |

-continued

Appendix A

| Component | Ref. Nr. | Description* |
|---|---|---|
| | | up/down dual clock counters |
| 4-bit counter | 160, 161, 189, 208, 209 | 74C93 4-bit binery counters |
| R-S flip-flop | 206, 230 | CD4044B quad R-S flip-flops |
| NOR gates | 155, 162, 194, 195, 210, 212 | 74C02 quad two-input NOR gates |
| Counter | 217 | CD4022B divide-by-8 counter with 1-of-8 outputs |
| Comparators | COMP 1, COMP 2 | LM 339 dual comparators |
| Inverters | 231, 232 | 74C240 octal buffers with inverted outputs |
| Buffer gates | 118, 120 | 74C244 octal buffers with noninverted outputs |
| ex-OR gates | 154, 175–179 | CD4040B ex-OR gates |
| ex-OR gate | 242 | 74LS86 ex-OR gates manufactured by Texas Instruments, Inc. |

*All circuit packages available from National Semiconductor or RCA unless a different manufacturer is specified.

We claim:

1. An I/O module for coupling I/O data signals between a plurality of I/O devices on a controlled system and a main processor, wherein the I/O data signals represent the status of the I/O devices and wherein the I/O module comprises:

means forming an isolation interface that electrically isolates I/O data signals coupled to or from the I/O devices from I/O data signals processed by the main processor;

a first integrated circuit operated in a selected one of four modes of operation, said four modes of operation including first, second, third, and fourth modes of operation, the second and fourth modes of operation being related by direction of I/O data transfer to the first and third modes of operation, respectively, the first integrated circuit being coupled between the main processor and the isolation interface when operated in the first mode and when operated in third mode; and a second integrated circuit operated in another selected one of said four modes of operation the second integrated circuit being coupled between the I/O devices and the isolation interface, the second integrated circuit being operated in the second mode when the first integrated circuit is operated in the first mode, and the second integrated circuit being operated in the fourth mode when the first integrated circuit is operated in the third mode, to couple I/O data signals through the I/O module.

2. The invention of claim 1, wherein the I/O module is an input module, wherein the first integrated circuit is operated in the first mode and includes means for addressing the second integrated circuit through the isolation interface, and wherein the second integrated circuit is operated in the second mode and includes means responsive to addressing from the first integrated circuit for transmitting input data signals through the isolation interface to the first integrated circuit.

3. The invention of claim 2, wherein the input data signals are transmitted serially from the second integrated circuit to the first integrated circuit.

4. The invention of claim 1, wherein the I/O module is an output module, wherein the second integrated circuit is operated in the fourth mode and includes means for addressing the first integrated circuit through the isolation interface, and wherein the first integrated circuit is operated in the third mode and includes means responsive to addressing from the second integrated circuit for transmitting output data signals through the isolation interface to the second integrated circuit.

5. The invention of claim 4, wherein the output data signals are transmitted serially by the first integrated circuit to the second integrated circuit.

6. An I/O module for coupling I/O data signals between a plurality of I/O devices on a controlled system and a main processor, wherein the I/O data signals represent the status of the I/O devices, and wherein the I/O module comprises:

means forming an isolation interface that isolates I/O data signals coupled to or from the I/O devices from I/O data signals processed by the main processor;

a first integrated circuit operated in a selected one of two modes of operation including a first input mode of operation and a first output mode of operation, the first integrated circuit including means for connection in one direction to the isolation interface and including means for connection in another direction for communication of I/O data signals with the main processor; and a second integrated circuit operated in a selected one of two modes of operation including a second input mode of operation and a second output mode of operation, the second integrated circuit including means for connection to the isolation interface to communicate I/O data signals with the first integrated circuit and including means for communication of I/O data signals with the I/O devices.

7. An I/O module for coupling I/0 data signals, representing the status of I/O devices on a controlled system, across an isolation interface between a first portion of the I/O module that communicates with the I/O devices and a second portion of the I/O module that communicates with a main processor, the I/O module comprising:

first parallel data means in the first portion of the I/O module for holding a plurality of I/O data signals in parallel;

second parallel data means in the second portion of the I/O module for holding a plurality of I/O data signals in parallel;

wherein the isolation interface includes first optical coupling means or coupling I/O data addresses in one direction across the isolation interface to one of said first and second parallel data means;

wherein the isolation interface also includes second optical coupling means for coupling I/O data as serial data across the isolation interface in a direction opposite the direction of the coupling of the I/O data addresses to the other of the said first and second parallel data means; and further comprising address generating means coupled to the first optical coupling means for transmitting a plurality of I/O data addresses thereto to cause I/O data to be transmitted serially through the second optical coupling means from one of said first and second parallel data means to the other.

8. The I/O module of claim 7, wherein:

the first parallel data means, the second parallel data means and the address generating means are included in a single integrated circuit;

wherein two such integrated circuits are included in the I/O module on opposite sides of the isolation interface;

wherein each integrated circuit also includes means responsive to mode selection signals to selectively activate the first parallel data means, the second parallel data means, and the address generating means according to which side of the isolation interface the integrated circuit is positioned and according to the input or output function of the I/O module; and further comprising means on the I/O module for coupling the mode selection signals to the integrated circuits.

9. The I/O module of claim 7, wherein:

the first optical coupling means couples a four-bit data address across the isolation interface; and wherein the second optical coupling means is an individual optical coupling circuit.

10. The I/O module of claim 7, wherein:

the isolation interface also includes a third optical coupling means for coupling a test signal across the isolation interface in the same direction as the I/O data addresses;

wherein the address generating means also transmits a plurality of error bit addresses and corresponding test signals through the first and third optical coupling means, respectively;

further comprising error bit generating means disposed across the isolation interface from the address generating means and responsive to the error bit addresses and test signals to transmit error bits through the second optical coupling means; and error detection means coupled to the one of the abovementioned parallel data means that receives the data, the error detection means being responsive to the error bits received through the second optical coupling means to inhibit further transfer of the data received through the second optical coupling means if an error is detected.

11. The I/O module of claim 10, wherein:

the first optical coupling means couples a four-bit data address across the isolation interface;

wherein the second optical coupling means is an individual optical coupling circuit; and wherein the third optical coupling means is another individual optical coupling circuit.

12. The invention of claim 7, wherein the I/O module is an output module which communicates with I/O devices that are output devices.

13. The invention of claim 12, wherein the output module includes AC output circuits coupled to the first parallel data means, the AC output circuits being responsive to I/O data signals from the first parallel data means to generate AC output signals to the output devices.

14. The invention of claim 7, wherein the I/O module is an input module which communicates with I/O devices that are input devices.

15. The invention of claim 14, wherein the input module has DC input circuits coupled to the first parallel data means, the DC input circuits being responsive to DC input signals from input devices to generate I/O data signals to the first parallel data means.

16. An input/output integrated circuit responsive to mode select signals to function in one of four modes including a first mode in which input data signals are transmitted to an I/O data bus for transmission to a main processor, a second mode in which input signals are received from input devices, a third mode in which output data signals are received from the main processor via the I/O data bus, and a fourth mode in which output signals are transmitted to output devices, the integrated circuit comprising:

address generating means for generating I/O data addresses;

demultiplexing means responsive to I/O data addresses from the address generating means when the integrated circuit is operated in its first mode for loading serial input data signals into parallel data positions, said demultiplexing means also being responsive to I/O dta addresses from the address generating means when the integrated circuit is operated in its fourth mode for loading serial output data siganls into parallel positions, and said demultiplexing means being coupled to transmit input data signals to the I/O data bus for transmission to the main processor when the integrated circuit is operated in its first mode;

output cirucit means coupled to said demultiplexing means and responsive to output data signals therefrom to transmit output signals to the output devices when the integrated circuit is operated in its fourth mode;

input circuit means responsive to input signals from input devies to generate input data signals when the intergrated circuit is operated in its second mode;

backplane data latch means for receiving from the I/O data bus and holding parallel output data signals when the integrated circuit is operated in its third mode; and multiplexing means coupled to the input circuit means for receiving parallel input data signals and responsive to I/O data addresses from the address generating means when the integrated circuit is operated in its second mode for transmitting parallel input data signals as serial data, sadi multiplexing means also being coupled to said backplane data latch means for receiving parallel ouput data signals, and said multiplexing means being responsive to I/O data addresses from the address generating means when the integrated circuit is operated in its third mode for sequentially transmitting parallel output data signals as serial data.

17. An I/O module for disposition in either one of two slots of an equipment rack and responsive to primary and secondary enabling signals in each slot, and to a high/low select signal received in one state in the first slot and received in an alternate state in the second slot to control the order of coupling of two bytes of I/O data over a byte-wide data bus that connects to both slots, the I/O module comprising:

data latching circuitry for holding two bytes of I/O data;

a first enabling circuit in controllling relation to the data latching circuitry, the first enabling circuit being positioned to receive the primary and secondary enabling signals and the high/low select signal in one state when the I/O module is in a first slot, and being responsive to the primary and secondary enabling signals to couple the two bytes of I/O data between the data bus and the data latching circuitry in sequence in response to the state of the high/low select signal received in the first slot; and a second enabling circuit in controlling relation to the data latching circuitry, the second enabling circuit being positioned to receive the primary and secondary enabling siganls in reverse order as compared with the first enabling circuit and being positioned to receive the enabling signals and the high/low select signal of alternate state when the I/O module is a second slot, the second enabling circuit being responsive to the primary and secondary enabling signals to couple two bytes of I/O data between the data bus and the data latching circuitry in the same sequence as the first enabling circuit.

18. The I/O module of claim 17, wherein the first enabling circuit is responsive to its primary enabling signal to cause a low order one of the two bytes to be coupled between the data latching circuitry and the data bus when the I/O module is positioned in the first slot.

19. The I/O module of claim 17, wherein the second enabling circuit is responsive to its primary enabling signal to cause a high order one of the two bytes to be coupled between the data latching circuitry and the data bus when the I/O module is positioned in the second slot.

* * * * *

UNITED STATES PATENT AND TRADEMARK OFFICE
CERTIFICATE OF CORRECTION

PATENT NO.  : 4,771,403
DATED       : Sept. 13, 1988
INVENTOR(S) : Maskovyak, et al.

It is certified that error appears in the above-identified patent and that said Letters Patent is hereby corrected as shown below:

Col. 30, line 62, "I/0" should be --I/O--.

Col. 31, line 8,  "or" should be --for--.

Col. 32, line 66, "sadi" should be --said--.

Col. 32, line 41, "I/O dta" should be --I/O data--.

Col. 32, line 44, "siganls" should be --signals--.

Col. 32, line 55, "devies" should be --devices--.

Col. 32, line 56, "intergrated" should be --integrated--.

Col. 33, line 16, "controllling" should be --controlling--.

Col. 34, line 4, "siganls" should be --signals--.

Signed and Sealed this

Eleventh Day of April, 1989

Attest:

DONALD J. QUIGG

Attesting Officer

Commissioner of Patents and Trademarks